(12) United States Patent
Zhang et al.

(10) Patent No.: US 11,436,311 B2
(45) Date of Patent: Sep. 6, 2022

(54) METHOD AND APPARATUS FOR SECURE AND USABLE MOBILE TWO-FACTOR AUTHENTICATION

(71) Applicant: Arizona Board of Regents on behalf of Arizona State University, Scottsdale, AZ (US)

(72) Inventors: Yanchao Zhang, Phoenix, AZ (US); Dianqi Han, Mesa, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 398 days.

(21) Appl. No.: 16/403,334

(22) Filed: May 3, 2019

(65) Prior Publication Data

US 2019/0362064 A1 Nov. 28, 2019

Related U.S. Application Data

(60) Provisional application No. 62/675,100, filed on May 22, 2018.

(51) Int. Cl.
*G06F 21/35* (2013.01)
*G10L 25/51* (2013.01)
*H04W 4/14* (2009.01)

(52) U.S. Cl.
CPC .............. *G06F 21/35* (2013.01); *G10L 25/51* (2013.01); *G06F 2221/2103* (2013.01); *G06F 2221/2129* (2013.01); *H04W 4/14* (2013.01)

(58) Field of Classification Search
CPC .......... G06F 21/31; G06F 21/35; G06F 21/34; G06F 21/44; G06F 21/316; G06F 21/32; G06F 21/42; G06F 2221/2129; G06F 2221/2103; G10L 25/51; G10L 25/18; G10L 25/21; H04L 63/10; H04L 63/0853; H04L 63/0807; H04L 63/0876; H04L 63/107; H04L 63/0838; H04L 63/102; H04L 63/08; H04L 63/083; H04L 63/0815; H04L 63/0861; H04L 9/3231; H04L 9/3213; H04L 9/3228; H04L 9/3226; H04L 2463/082; H04W 4/14; H04W 12/06;
(Continued)

(56) References Cited

U.S. PATENT DOCUMENTS 6,826,690 B1 * 11/2004 Hind .................... H04L 9/3273
713/176
7,436,988 B2 10/2008 Zhang et al.
(Continued)

OTHER PUBLICATIONS

Chen et al., S2M: A Lightweight Acoustic Fingerprints-Based Wireless Device Authentication Protocol, IEEE, Feb. 2017.*
(Continued)

*Primary Examiner* — David Garcia Cervetti
(74) *Attorney, Agent, or Firm* — Elliott, Ostrander & Preston, P.C.

(57) ABSTRACT

Allowing a user access to a computer-controlled resource by transmitting an authentication challenge to a computing device of the user, receiving an authentication response as a human-inaudible acoustic signal automatically transmitted from the computing device without input from the user, and allowing access to the computer-controlled resource responsive to the received authentication response.

18 Claims, 16 Drawing Sheets

(58) Field of Classification Search
CPC . H04W 12/068; H04W 12/069; H04W 12/63; H04W 12/08

See application file for complete search history.

(56) References Cited

U.S. PATENT DOCUMENTS

| | | | | |
|---|---|---|---|---|
| 7,966,497 | B2* | 6/2011 | Gantman | H04L 9/3226 |
| | | | | 382/116 |
| 9,594,896 | B2 | 3/2017 | Rosati et al. | |
| 9,642,543 | B2 | 5/2017 | Banerjee et al. | |
| 9,842,891 | B2 | 12/2017 | Yeh et al. | |
| 2013/0324081 | A1* | 12/2013 | Gargi | G06F 21/35 |
| | | | | 455/411 |
| 2015/0127342 | A1* | 5/2015 | Sharifi | G10L 17/18 |
| | | | | 704/239 |
| 2017/0257760 | A1* | 9/2017 | Moran | H04W 4/023 |
| 2018/0018970 | A1* | 1/2018 | Heyl | G06V 40/168 |
| 2018/0068567 | A1* | 3/2018 | Gong | G05D 1/106 |
| 2018/0096116 | A1* | 4/2018 | Vaughn | G06F 21/316 |
| 2019/0013027 | A1* | 1/2019 | Page | H04L 9/3247 |
| 2019/0043508 | A1* | 2/2019 | Sak | G10L 17/00 |
| 2019/0003327 | A1 | 4/2019 | Chen | |
| 2019/0003421 | A1 | 4/2019 | Zhang | |
| 2019/0332757 | A1 | 10/2019 | Chen et al. | |
| 2019/0342103 | A1 | 11/2019 | Zhang et al. | |
| 2019/0362064 | A1* | 11/2019 | Zhang | G10L 25/51 |
| 2020/0034566 | A1 | 1/2020 | Zhang et al. | |
| 2020/0184057 | A1* | 6/2020 | Mukund | H04W 12/06 |
| 2020/0309930 | A1* | 10/2020 | Zhou | G06V 40/172 |

OTHER PUBLICATIONS

Anupam Das et al., Fingerprinting Smart Devices Through Embedded Acoustic Components, ArXiv, Mar. 2014.*

Wu, L., et al., "Relational Learning with Social Status Analysis," Proceedings of the Ninth ACM International Conference on Web Search and Data Mining, ACM (2016) pp. 513-522.

Xu, S., et al., "Robust efficient estimation of heart rate pulse from video," Biomedical Optics Express, vol. 5, No. 4, (Mar. 2014), pp. 1124-1135.

Xu, y., et al., "Virtual U: Defeating Face Liveness Detection by Building Virtual Models from Your Public Photos," USENIX Association, 25th USENIX Security Symposium Aug. 10-12, 2016, 17 pages.

Yanardag, P., et al., "Deep Graph Kernels," Proceedings of the 21th ACM SIGKDD International Conference on Knowledge Discovery and Data Mining, ACM, (2015), pp. 1365-1374.

Yang, J., et al., "Community Detection in Networks with Nodes Attributes," Data Mining ICDM IEEE 2013 13th International Conference on IEEE, (2013) pp. 1151-1156.

Yubico Inc., "Yubikey Hardware," (2018), https://yubico.com/.

Zhang, J., et al., "Privacy-preserving Social Media Data Outsourcing," http://cnsg.asu.edu/papers/ixzhangINFOCOM18Full.pdf (2018) Honolulu, HI, USA, 9 pages.

Zhang, J., et al., "Your Actions Tell Where You Are: Uncovering Twitter Users in A Metropolitan Area," IEEE CNS, (Sep. 2015) Florence Italy.

Zhang, J., et al., "Your Age is No Secret: Inferring Microbloggers' Ages Via Content and Interaction Analysis," CWSM, (May 2016) Cologne, Germany.

Zhou, Z., et al., "Acoustic Fingerprinting Revisited: Generate Stable Device ID Stealthy with Inaudible Sound," ACM CCS, (Nov. 2014) Scottsdale, AZ , 12 pages.

U.S. Appl. No. 16/403,334, filed May 3, 2019, Yanchao Zhang.
U.S. Appl. No. 16/521,321, filed Jul. 24, 2019, Yanchao Zhang.
U.S. Appl. No. 62/664,844, filed Apr. 30, 2018, Yimin Chen.
U.S. Appl. No. 62/666,049, filed May 2, 2018, Yanchao Zhang.
U.S. Appl. No. 62/675,100, filed May 22, 2018, Yanchao Zhang.
U.S. Appl. No. 62/702,837, filed Jul. 24, 2018, Yanchao Zhang.

"An Exhaustive Study of Twitter Users Across the World," http://temp.beevolve.com/twitter-statistics/ (Oct. 2012).

Ahmed, F., et al., "Social Graph Publishing with Privacy Guarantees," ICDCS, (Aug. 11, 2016), Nara, Japan.

Andrés, M., et al., "Geo-indistinguishability: Differential Privacy for Location-Based Systems," CCS (2013) Berlin Germany.

Asthana, A., et al., "Incremental Face Alignment in the Wild," IEEE CVPR'14, (Jun. 2014), 8 pages.

Bishop, C., "Pattern Recognition and Machine Learning," Springer, (2006), 66 pages.

Blum, A., et al., "A Learning Theory Approach to Non-interactive Database Privacy," STOC, (2008), Victoria, British Columbia, Canada.

Chen, D., et al., "S2M: A Lightweight Acoustic Fingerprints-based Wireless Device Against Data Theft," IEEE Internet of Things Journal, vol. 4, No. 1, (2017) pp. 88-100.

Chen, D., et al., "Wireless Device Authentication Using Acoustic Hardware Fingerprints," BigCom, (Aug. 2015), Taiyuan, China, pp. 193-204.

Chen, S., et al., "Sensor-Assisted Facial Recognition: An Enhanced Biometric Authentication System for Smartphones," ACM MobiSys'14, (Jun. 2014), 14 pages.

Chen, X., et al., "A Comparative Study of Demographic Attribute Inference in Twitter," ICWSM, (May 2015) Oxford, England.

Chen, Y. et al., "Your Face Your Heart: Secure Mobile Face Authentication with Photoplethysmograms," IEEE Infocom 2017— IEEE Conference on Computer Communications (2017), 9 pages.

Chen, Y., et al., "Your Song Your Way: Rhythm-Based Two-Factor Authentication for Multi-Touch Mobile Devices," IEEE INFOCOM'15, (Apr.-May 2015), 9 pages.

Czeskis, A., "Strengthening User Authentication Through Opportunistic Cryptographic Identity Assertions," ACM CCS, (Oct. 2012) Raleigh, NC, 11 pages.

D. Inc., "Duo Push," (2018) https://www.duosecrurity.com/product/methods/duo-mobile.

Das, A., et al., "Do You Hear What I Hear? Fingerprinting Smart Devices Through Embedded Acoustic Components," ACM CCS, (Nov. 2014), Scottsdale, AZ, 12 pages.

Derham, T., et al., "Design and Evaluation of a Low-cost Multistatic Netted Radar System," IET Radar, Sonar & Navigation, vol. 1 No. 5 (Oct. 2007).

Dey, R., et al., "Estimating Age Privacy Leakage in Online Social Networks," INFOCOM, (2012).

Dey, R., et al., "Facebook Users Have Become Much More Private: A Large-Scale Study," IEEE PERCOM Workshops (Mar. 19-23, 2012), Lugano, Switzerland.

Dwork, C., "Differential Privacy," Automata, Languages and Programming, (2011), Encyclopedia of Cryptography and Security. Springer, Boston, MA.

Encap Security Inc., "Encap Security," (2018) https://www.encapsecurity.com/.

Friedman, N., et al., "Bayesian Network Classifiers," Machine Learning, vol. 29, No. 2-3, (1997), pp. 131-163.

Fung, B., et al., "Privacy-preservingData Publishing: A Survey of Recent Developments," ACM Computing Surveys, vol. 42, No. 4, (2010) pp. 14:1-14:52.

Gadkari, P., "How Does Twitter Make Money?," http://www.bbc.com/news/business-24397472, (Nov. 2013).

Ghiass, R., et al., "Infared Face Recognition: A Literature Review," IEEE IJCNN'13, (Aug. 2013), 10 pages.

Goodin, D., "RSA Breach Leaks Data for Hacking SecurID Tokens" (Mar. 18, 2011) https://goo.gl/PRkb95.

Goodin, D., "RSA SecurID Software Token Cloning: A New How-to," (2012) https://goo.gl/Vy32JP.

Google Inc., "Google 2-Step Verification," (2018) https://www.google.com/landing/2step/.

Gregoski, M., et al., "Development and Validation of a Smartphone Heart Rate Acquisition Application for Health Promotion and Wellness Telehealth Applications," International Journal of Telemedicine and Applications, vol. 2012, (2012), 7 pages.

(56) References Cited

OTHER PUBLICATIONS

Gunson, N., et al., "User Perceptions of Security and Usability of Single-factor and Two-factor Authentication in Automated Telephone Banking," Computers & Security, vol. 30, No. 4, (Jun. 2011), pp. 208-220.

Hall, M., et al., "The WEKA Data Mining Software: An Update," ACM SIGKDD Explorations Newsletter, vol. 11, No. 1, (2009), pp. 10-18.

Han, D., et al., "Proximity-Proof: Secure and Usable Mobile Two-Factor Authentication," MobiCom '18 Proceedings of the 24th Annual International Conference on Mobile Computing and Networking (2018), pp. 401-415.

Hanley, J., et al., "The Meaning and Use of the Area Under a Receiver Operating Characteristic (ROC) Curve," Radiology, vol. 143, No. 1, 1982, pp. 29-36.

Haykin, S., "A Comprehensive Foundation," Neural Networks, vol. 2, Chapter 4 (2004), 100 pages.

Haykin, S., et al., "Least-Mean-Square Adaptive Filters," John Wiley & Sons, vol. 31, (2003), 11 pages.

Hom, E., "Mobile Device Security: Startling Statistics on Data Loss and Data Breaches," Channel Pro Network, https://www.channelpronetwork.com/article/mobile-device-security-startling-statistics-data-loss-and-data-breaches.

http://resources.alcatel-lucent.com/asset/189669, Nokia (2016).

https://i-msdn.sec.s-msft.com/dynmig/IC584331.png (2019).

Ji, S., et al., "On Your Social Network De-anonymizability: Quantification and Large Scale Evaluation with Seed Knowledge," NDSS, (Feb. 2015), San Diego, CA.

Karapanos, N., et al., "Sound-proof. Usable Two-factor Authentication Based on Ambient Sound," USENIX Security (Aug. 2015) Washington DC, 17 pages.

Köhm, O., et al., "2D Face Liveness Detection: an Overview," IEEE BIOSIG'12, (Sep. 2012), pp. 171-182.

Kollreider, K., et al., "Non-intrusive liveness detection by face images," Image and Vision Computing, vol. 27, No. 3, (Feb. 2009), pp. 233-244.

Kulpa, K., "Continuous Wave Radar-monostatic, Multistatic and Network," Advances in Sensing with Security Applications, (2006), pp. 215-242.

Kumar, M., et al., "DistancePPG: Robust non-contact vital signs monitoring using a camera," Biomedical optics express, vol. 6, No. 5, (May 2015), pp. 1565-1588.

Kumparak, G., "Slicklogin Wants to Kill the Password by Singing a Silent Song to Your Smartphone/," (2013), https://goo.gl/RBGkX3.

Lam, A., et al., "Robust Heart Rate Measurement from Video Using Select Random Patches," IEEE CVPR'15, (Dec. 2015), pp. 3640-3648.

Leskovec, J., et al., "Mining Massive Datasets," Ch. Data Mining, (2014), Cambridge University Press, pp. 7-9.

Lewandowska, M., et al., "Measuring Pulse Rate with a Webcam—a Non-contact Method for Evaluating Cardiac Activity," IEEE FedCSIS'11, (Sep. 2011), pp. 405-410.

Li, L., et al., "Unobservable Re-authentication for Smartphones," NDSS'13, (Feb. 2013), 16 pages.

Li, R., et al., "Towards Social User Profiling: Unified and Discriminative Influence Model for Inferring Home Locations," KDD, (Aug. 2012) Beijing, China.

Li, T., et al., "iLock: Immediate and Automatic Locking of Mobile Devices Against Data Theft," ACM CCS'16, (Oct. 2016), pp. 933-944.

Li, X., et al., "Remote Heart Rate Measurement from Face Videos Under Realistic Situations," IEEE CVPR'14, (Jun. 2014), pp. 4321-4328.

Li, Y., et al., "Seeing Your Face is Not Enough: An Inertial Sensor-Based Liveness Detection for Face Authentication," ACM CCS'15, (Oct. 2015), pp. 1558-1569.

Liu, C., et al., "Dependence Makes You Vulnerable: Differential Privacy Under Dependent Tuples," NDSS, (Feb. 2016) San Diego, CA.

Liu, C., et al., "Linkmirage: How to Anonymize Links in Dynamic Social Systems," NDSS, (Feb. 2016), San Diego, CA.

Lucas, B., et al., "An Iterative Image Registration Technique with an Application to Stereo Vision," IJCAI, vol. 81, (1981), pp. 674-679.

Mao, H., et al., "Loose Tweets: An Analysis of Privacy Leaks on Twitter," WPES, (Oct. 2011) Chicago, IL.

Mao, W., et al., "Cat: High-precision Acoustic Motion Tracking," ACM MobiCom, (Oct. 2016), New York, NY, USA.

Mittal, P., et al., "Preserving Link Privacy in Social Network Based Systems," NDSS, (Feb. 2013), San Diego, CA.

Määttä, J., et al., "Face Spoofing Detection From Single Images Using Micro-Texture Analysis," IEEE IJCB'11, (Oct. 2011), 7 pages.

Nandakumar, R., et al., "FingerIO: Using Active Sonar for Fine-grained Finger Tracking," ACM CHI, (May 2016), San Jose, CA.

Narayanan, A., et al., "De-anonymizing Social Networks," SP, (2009).

Nguyen, D., et al., ""How Old Do You Think I Am?"; A Study of Age in Twitter," ICWSM (Jul. 2013), Boston, IL.

Nilizadeh, S., et al., "Community-enhanced De-anonymization of Online Social Networks," CCS, (2014), Scottsdale, AZ.

Peeters, R., et al., "N-Auth: Mobile Authentication Done Right," ACSAC, (Dec. 2017), Orlando, FL.

Peng, C., et al., "Beepbeep: A High Accuracy Acoustic Ranging System Using COTS Mobile Devices," ACM Sensys LLC., (Nov. 2007), Sydney, Australia.

Poh, M.Z., et al., "Non-contact, automated cardiac pulse measurements using video imaging and blind source separation," Optics Express, vol. 18, No. 10, (May 2010), pp. 10792-10774.

Porter, M., "Readings in Information Retrieval," Ch. An Algorithm for Suffix Stripping, (1997), pp. 313-316 Morgan Kaufman Publishers Inc.

Qian, J., et al., "De-anonymizing Social Networks and Inferring Private Attributes Using Knowledge Graphs," INFOCOM, (2016) San Francisco, CA, USA.

RSA Security LLC., "RSA securID," (2020) https://www.rsa.com/en-us/products/rsa-securid-suite/rsa-securid-access.

Shahzad, M., et al., "Secure Unlocking of Mobile Touch Screen Devices by Simple Gestures: You can see it but you can not do it," ACM MobiCom'13, (Sep. 2013), 12 pages.

Shelley, K., et al., "Pulse Oximeter Waveform: Photoelectric Plethysmography," Clinical Monitoring, WB Saunders Company, (2001), pp. 420-428.

Shi, J., et al., "Good Features to Track," IEEE CVPR'94, (Jun. 1994), 33 pages.

Shirvanian, M., et al., "Two-factor Authentication Resilient to Server Compromise Using Mix-bandwidth Devices," NDSS, (Feb. 2014), San Diego, CA, 16 pages.

Shrestha, B., et al., "The Sounds of the Phones: Dangers of Zero-effort Second Factor Login Based on Ambient Audio," ACM CCS, (Oct. 2016) Vienna, Austria, 12 pages.

Sun, J., et al., "TouchIn: Sightless Two-factor Authentication on Multi-touch Mobile Devices," IEEE CNS'14, (Oct. 2014), 14 pages.

Szabo, T., "Time Domain Wave Equations for Lossy Media Obeying a Frequency Power Law," The Journal of the Society of America, vol. 96, No. 1 (1994), pp. 492-500.

Tai, C.-H., et al., "Identities Anonymization in Dynamics Social Networks," ICDM, (Dec. 11-14, 2011), Vancouver, BC, Canada.

Tan, X., et al., "Face Liveness Detection from A Single Image with Sparse Low Rank Bilinear Discriminative Model," ECCV'10, (Sep. 2010), 14 pages.

Tang, J., et al., "Line, Large-scale Information Network Embedding," Proceedings of the 24th International Conference on World Wide Web, ACM (2015) pp. 1067-1077.

Tang, L., et al., "Relational Learning Via Latent Social Dimensions," Proceedings of the 15th ACM SIGKDD International Conference on Knowledge Discovery and Data Mining, ACM (2009), pp. 817-826.

Tian, F., et al., "Learning Deep Representations for Graph Clustering," AAAI (2014) pp. 1293-1299.

(56) References Cited

OTHER PUBLICATIONS

Tomasi, C., et al., "Detection and Tracking of Point Features," School of Computer Science, Carnegie Mellon University, 1991.
Twilio Inc., "Authy," (2018) https://www.authy.com.
Twitter, "Twitter api," [Online] Available: https://dev.twitter.com/rest/public (2015).
U.S. Appl. No. 16/782,349.
Verkruysse, W., et al., "Remote plethysmographic imaging using ambient light," Optics Express, vol. 16, No. 26, (2008), pp. 21434-21445.
Viola, P., et al., "Rapid Object Detection Using a Boosted Cascade of Simple Features," IEEE CVPR'01, (Dec. 2001), 11 pages.
Wang, G., et al., "Outsourcing Privacy-preserving Social Networks to a Cloud," INFOCOM, (Apr. 14-19, 2013), Turin, Italy.
Wang, Q., et al., "Messages Behind the Sound: Real-time Hidden Acoustic Signal Capture with Smartphones," ACM MobiCom, (Oct. 2016), New York City, NY.
Wang, W., et al., "Performance Prediction of a Synchronization Link for Distributed Aerospace Wireless Systems," The Scientific World Journal, vol. 2013 (Jul. 2013).
Wei, T., et al., "mtrack: High-precision passive tracking using millimeter wave radios," ACM MobiCom, (Sep. 2015) Paris, France.
Weir, C., et al., "Usable Security: User Preferences for Authentication Methods in Ebanking and the Effects of Experience," Interacting with Computers, vol. 22, No. 3, (Oct. 2009), pp. 153-164.
Wu, L., et al., "Adaptive Spammer Detection with Sparse Group Modeling," ICWSM, (2017) pp. 319-326.
Wu, L., et al., "Detecting Camouflaged Content Polluters," ICWSM, (2017), pp. 696-699.
Wu, L., et al., "Detecting Crowdturfing in Social Media," Encyclopedia of Social Network Analysis and Mining, (2017).
Wu, L., et al., "Gleaning Wisdom from the Past: Early Detection of Emerging Rumors in Social Media," Proceedings of the 2017 SIAM International Conference on Data Mining, SIAM, (2017), pp. 99-107.
Wu, L., et al., "Mining Misinformation in Social Media," Big Data in Complex and Social Networks (2016), pp. 123-152.

\* cited by examiner

| | iPhone 5 | iPhone SE | Nexus 7 | Nexus 6 A | Nexus 6 B | Honor 8 | S5 A | S5 B |
|---|---|---|---|---|---|---|---|---|
| iPhone 5 | 0.0000 | 0.3284 | 0.3494 | 0.0453 | 0.1418 | 0.0968 | 0.2241 | 0.2451 |
| iPhone SE | 0.3284 | 0.0000 | 0.3124 | 0.1404 | 0.1217 | 0.2835 | 0.3172 | 0.2650 |
| Nexus 7 | 0.3494 | 0.3124 | 0.0000 | 0.3240 | 0.0747 | 0.0989 | 0.0217 | 0.2436 |
| Nexus 6 A | 0.0453 | 0.1404 | 0.3240 | 0.0000 | 0.1328 | 0.0696 | 0.2503 | 0.2301 |
| Nexus 6 B | 0.1418 | 0.1217 | 0.0747 | 0.1328 | 0.0000 | 0.1101 | 0.2024 | 0.3208 |
| Honor 8 | 0.00968 | 0.2835 | 0.0989 | 0.0696 | 0.1101 | 0.0000 | 0.3040 | 0.2384 |
| S5 A | 0.2241 | 0.3172 | 0.0217 | 0.2503 | 0.2024 | 0.3040 | 0.0000 | 0.3305 |
| S5 B | 0.2451 | 0.2650 | 0.2436 | 0.2301 | 0.3208 | 0.2384 | 0.3305 | 0.0000 |

FIG. 8

| | iPhone 5 | iPhone SE | Nexus 7 | Nexus 6 A | Nexus 6 B | Honor 8 | S5 A | S5 B |
|---|---|---|---|---|---|---|---|---|
| iPhone 5 | 0.0000 | 0.5604 | 0.5057 | 0.6587 | 0.6854 | 0.8711 | 0.4784 | 0.4308 |
| iPhone SE | 0.5604 | 0.0000 | 0.8167 | 0.7094 | 0.7255 | 0.8851 | 0.8762 | 0.7011 |
| Nexus 7 | 0.5057 | 0.8167 | 0.0000 | 0.9655 | 0.7829 | 0.4544 | 0.4448 | 0.5095 |
| Nexus 6 A | 0.6587 | 0.7094 | 0.9655 | 0.0000 | 0.7398 | 0.6264 | 0.8930 | 0.5829 |
| Nexus 6 B | 0.6854 | 0.7255 | 0.7829 | 0.7398 | 0.0000 | 0.9526 | 0.5333 | 0.4502 |
| Honor 8 | 0.8711 | 0.8851 | 0.4544 | 0.6264 | 0.9526 | 0.0000 | 0.8722 | 0.6535 |
| S5 A | 0.4784 | 0.8762 | 0.4448 | 0.8930 | 0.5333 | 0.8722 | 0.0000 | 0.7992 |
| S5 B | 0.4308 | 0.7011 | 0.5095 | 0.5829 | 0.4502 | 0.6535 | 0.7992 | 0.0000 |

FIG. 9

|          | iPhone 5 | iPhone SE | Nexus 7 A | Nexus 7 B | Nexus 6 A | Nexus 6 B | Honor 8 | S5 A | S5 B |
|----------|----------|-----------|-----------|-----------|-----------|-----------|---------|------|------|
| iPhone 5 | 0.0000 | 0.4848 | 1.1452 | 0.7353 | 0.7888 | 0.5739 | 0.4168 | 0.9592 | 0.6227 |
| iPhone SE | 0.7141 | 0.0000 | 0.9397 | 0.7703 | 0.9957 | 0.6599 | 0.8306 | 0.7131 | 0.5020 |
| Nexus 7 A | 0.8316 | 0.8109 | 0.0000 | 0.6571 | 0.7717 | 0.9490 | 0.6086 | 0.8685 | 0.4590 |
| Nexus 7 B | 0.6158 | 0.9174 | 0.5632 | 0.0000 | 0.6013 | 0.7929 | 0.7644 | 0.7257 | 0.5937 |
| Nexus 6 A | 0.7552 | 0.6223 | 0.7094 | 0.4524 | 0.0000 | 0.7582 | 0.5241 | 0.5480 | 0.4382 |
| Nexus 6 B | 0.4727 | 0.4944 | 0.6762 | 0.9367 | 0.5936 | 0.0000 | 0.9968 | 0.7157 | 0.4219 |
| Honor 8 | 0.9516 | 0.5195 | 0.6926 | 0.8011 | 0.4355 | 0.9334 | 0.0000 | 0.5994 | 0.7589 |
| S5 A | 1.2685 | 0.8346 | 0.6523 | 0.7592 | 0.4060 | 0.8439 | 0.7732 | 0.0000 | 0.5682 |
| S5 B | 0.6452 | 1.0135 | 0.9257 | 0.6191 | 0.4627 | 0.5394 | 0.5773 | 0.9562 | 0.0000 |

FIG. 12

(a) Office (b) Bookstore (c) Coffee house

METHOD AND APPARATUS FOR SECURE AND USABLE MOBILE TWO-FACTOR AUTHENTICATION

CROSS-REFERENCE TO RELATED APPLICATIONS

This application claims priority to U.S. provisional patent application No. 62/675,100, filed May 22, 2018, entitled "Method and Apparatus for Secure and Usable Mobile Two-Factor Authentication".

STATEMENT REGARDING FEDERALLY SPONSORED RESEARCH

This invention was made with government support under contract number CNS-1619251 awarded by the National Science Foundation. The government has certain rights in the invention.

TECHNICAL FIELD

Embodiments of the invention relate to techniques to conclusively identify a particular electronic device, such as a mobile communications device, based on a unique frequency response to audio communications exchanged with its speaker and/or its microphone, and application of such to automatically and securely respond to a multi-factor authentication request.

BACKGROUND

Mobile two-factor authentication (2FA) is pervasive along with the popularity of mobile devices. Mobile 2FA adds a smartphone or other mobile devices as the second layer of security to online accounts, as passwords are increasingly easy to steal, guess, or hack. When a user logs into an online system employing mobile 2FA, the user enters information known to the user, such as the user's username and password, as usual. Then the online system will verify whether the user has the pre-registered mobile device and allow the user access to the online system if so. For example, SMS-based 2FA interacts directly with a user's mobile phone. After receiving a username and password, the online system (e.g., web-site the user is attempting to log into) sends the user a unique one-time passcode (OTP) via text message to the user's pre-registered mobile device. The user must then enter the OTP back into the application before getting access. Similarly, voice-based 2FA automatically dials a user's pre-registered mobile device and verbally delivers the 2FA code. So mobile 2FA lets a user's mobile device serve as another proof of the user's identity and can better keep the user's account safe even if their username and/or password is compromised.

Commercial mobile 2FA solutions such as Google 2-Step Verification, Duo Multi-Factor authentication, available from Cisco Systems, Inc., and Encap Security, available from Encap AS, all require user involvement. For example, a Duo user needs to enroll their mobile phone (or other similar device, e.g., tablet, smart watch, hardware token, or software equivalents thereof) and install the Duo Mobile app on their mobile phone. There are three authentication methods for the online system to verify the user's possession of the enrolled mobile phone. First, the system can send a notification (called Duo Push) that the user needs to approve in Duo Mobile. Second, the system can call the enrolled mobile phone for the user to answer and press a key to approve the login. Finally, the user can enter a passcode on the login interface, which can be texted to the enrolled mobile phone by the system or generated in Duo Mobile. Other mobile 2FA solutions all adopt similar authentication methods. Such demand for user interactions negatively affects the experience of mobile users, especially senior citizens or those with disability such as blind and visually impaired users. What is needed is a 2FA system that provides improved usability and security.

Recent efforts attempt to improve the usability of mobile 2FA schemes by eliminating user interactions. Prior art systems may execute cryptographic challenge-response protocols over a Bluetooth channel between an enrolled mobile phone and the login device. Authy, available from Twilio Inc., is another Bluetooth-based 2FA method and requires extra software on the computer. However, such Bluetooth functionalities may not be supported by standard web browsers. Sound-Proof, a 2FA scheme based on ambient sound proposed by Nikolaos Karapanos, Claudio Marforio, Claudio Soriente, and Srdj an Capkun, ETH Zurich, leverages ambient sound to detect the proximity between the phone and login device, but it fails if an adversary can induce sound that dominates ambient noise. These schemes are not designed to withstand so-called "man-in-the-middle" (MiM) attacks, in which an adversary stealthily relays the messages between the enrolled mobile phone and a remote login device used by the adversary, and the co-located attack where the login device used by the adversary is near the enrolled mobile phone and can thus bypass proximity checks.

SUMMARY

A method and apparatus is disclosed for a user to access to a computer-controlled resource. Embodiment involve transmitting an authentication challenge to a computing device of the user, receiving an authentication response as a human-inaudible acoustic signal automatically transmitted from the computing device without input from the user, and allowing access to the computer-controlled resource in response to the received authentication response.

BRIEF DESCRIPTION OF THE DRAWINGS

FIG. 8 illustrates the distance between one mobile device's fingerprint extracted by different devices.

FIG. 9 depicts the distance between fingerprints of different mobile devices.

FIG. 12 depicts the distance between original fingerprint and the fingerprint extracted from replayed audio.

WRITTEN DESCRIPTION

1. Introduction

Figure 1:
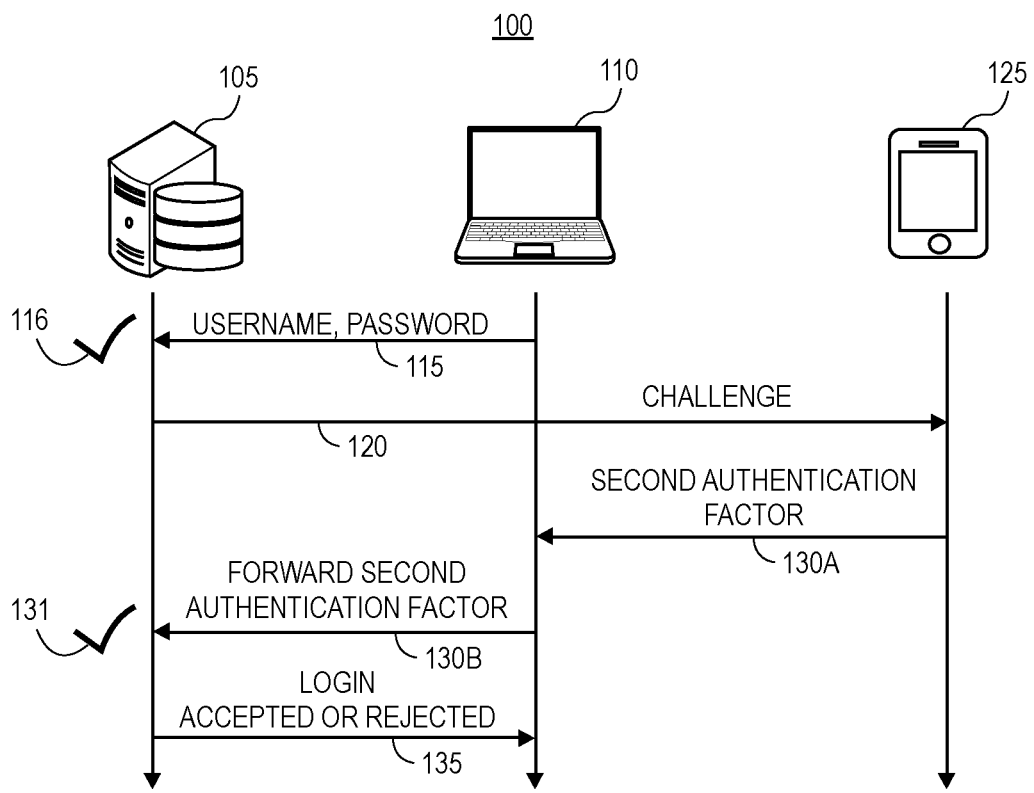
FIG. 1 illustrates a two-factor authentication (2FA) system model.

Embodiments of the invention provide a secure and usable mobile multi-factor authentication (e.g., two-factor authentication (2FA)) system without involving user interactions. The embodiments automatically transmit a user's two-factor authentication (2FA) response via inaudible Orthogonal Frequency Division Multiplexing (OFDM)-modulated audio signals from the user's mobile device to an access control device, such as the laptop PC that is used as a login device/has a web browser that the user is attempting to log into. Embodiments of the invention extract individual, unique, speaker and/or microphone fingerprints of a mobile device and use such to defend against a man-in-the-middle (MiM) attack. In addition, embodiments of the invention explore two-way audio distance ranging to thwart a co-located attack. Since a computer utilizes the unique speaker and/or microphone fingerprints that are inherent to the mobile device for authentication, which cannot be spoofed unlike Internet-Protocol (IP) spoofing, and can identify MiM attacks and mitigate against them, embodiments of the invention improve the security of the computer. Empirical analysis of embodiments of the invention show the embodiments are at least as secure as existing mobile 2FA solutions while being highly usable. Furthermore, prototypes of the embodiments confirm their high security, usability, and efficiency for a variety of smartphones and tablets.

Embodiments of the invention provide a novel mobile 2FA scheme with one or more of the following four goals in mind. First, the embodiments are zero-effort (usable), that is, they require no user interactions with an enrolled mobile phone. Second, the embodiments are secure against various attacks on mobile 2FA schemes, including MiM and co-located attacks. Third, the embodiments are deployable in the sense that they can be easily implemented in web browsers and smartphones. Fourth, the embodiments are compatible, meaning that they can be easily integrated into commercial mobile 2FA solutions.

The user response in each aforementioned mobile 2FA authentication method involves transmitting some information either directly or indirectly via a login device to the online system. Embodiments of the invention achieve zero user effort by fully automating the user-response transmission via high-frequency acoustic signals inaudible to humans. Specifically, an enrolled mobile phone emits high-frequency, inaudible, or nearly inaudible, acoustic signals from the enrolled mobile phone's speaker that contain the user response, for example, a 4 or 6 digit PIN sent from the web-server to the mobile device; and the login device/web browser receives such acoustic signals via its microphone to decode the user response and send the acoustic signals to the online system for verification. Embodiments employ OFDM and, optionally, error-correction codes to ensure reliable acoustic transmissions even in very noisy environments.

Embodiments defend against the MiM attack by speaker and microphone fingerprinting. In particular, the speaker and microphone in each phone have unique mechanical and electronic features due to manufacturing imperfections or variances. These features cause the exchange of unique acoustic signals that can be used as signatures, either solely or in combination, to uniquely identify a particular phone. After authenticating the user response, the login device in one embodiment ascertains that the enrolled mobile phone is indeed nearby to detect and avoid possible MiM attacks. Embodiments involve a method for the login device to extract the speaker and/or microphone fingerprints of an enrolled mobile phone (also referred to herein as a prover phone) for comparison with stored copies of the speaker and/or microphone fingerprints. In the presence of the MiM attack, the login device obtains the speaker and microphone fingerprints of an adversarial device, which do not match the stored copies of the speaker and/or microphone fingerprints of the enrolled mobile phone, in which case the proximity check fails. Prior efforts to fingerprint microphones and speakers require the pair of the recording microphone in the login device or phone and the emitting speaker in the other device. These schemes do not work when the login device can be an arbitrary device not known a priori (e.g., a library computer) with regard to the enrolled mobile phone. In contrast, embodiments of the invention generate and authenticate individual speaker fingerprints and/or microphone fingerprints for a single mobile device, regardless of the other device with which it happens to be paired at the time of authentication.

Embodiments of the invention thwart a co-located attack, by acoustic distance ranging while verifying, or not, that the prover phone indeed has speaker and/or microphone fingerprints that match those previously stored for the enrolled mobile phone, with overwhelming probability. If the measured distance between the login device and the prover phone (purportedly the enrolled mobile phone) is larger than a system threshold, the co-located attack is detected, in which case the login request is rejected.

The security of embodiments of the invention have been analyzed and their performance evaluated through comprehensive experiments on a variety of smartphones and tablets. The experiments show that embodiments can automatically execute the authentication procedure without user interaction and are resilient against the MiM and co-located attacks. In particular, the experiment results show that embodiments can detect the MiM attack and decline illegitimate login attempts in all cases via accurate acoustic fingerprinting. In addition, embodiments can detect all co-located attacks launched by attackers up to 60 cm (approximately 2 feet) away from the user's mobile device via cross-device ranging. Moreover, when using a 6-digit passcode as in Duo, embodiments incur an average authentication latency of less than 2 seconds, which is significantly shorter than that of Duo's fastest push option. In addition, using a long passcode does not introduce any noticeable increase in the authentication latency of embodiments of the invention. These results confirm the high usability and security of the embodiments.

Section 2, below, describes the system in which embodiments of the invention may operate and adversary/attacker models. Section 3, further below, describes embodiments of the invention. Section 4 thereafter analyzes the security of the embodiments. The following section 5 presents the experimental evaluation of the embodiments. Section 6 describes a computing environment in which embodiments of the invention may operate.

2. System and Adversary/Attacker Models

2.1 System Model

A standard mobile 2FA system model is introduced based on Duo for the purpose of describing a basic model in which embodiments of the invention can operate. However, it is appreciated that embodiments of the invention also operate in other mobile 2FA systems such as Google 2-Step Verification and Encap Security with very minor modifications.

As shown in FIG. 1, a general 2FA model 100 is illustrated in which a web server 105 processes login requests from user at login devices such as login device 110 via an interface, such as a web browser-based interface presented at the login device 110. The web server 105 integrates a 2FA system, such as a Duo 2FA module. The server-browser communications are secured with traditional Transport Layer Security (TLS)-like mechanisms such as HTTPS. Furthermore, each legitimate user enrolls their mobile phone and also installs a multi-factor authentication application such as the Duo Mobile app so that the mobile phone can participate in multi-factor authentication, e.g., 2FA.

A user can log into the system via an arbitrary networked login device 110, such as a phone, a tablet, a personal desktop or laptop, or even a public computer like one in a library or other public space. When the user attempts to log in, the user inputs the usual username and password at the browser interface, which are then relayed as depicted at 115 to the web server 105 via the secure channel. Once the username and password are verified, as depicted by the check mark 116, the web server 105 sends a challenge as depicted at 120 to the enrolled mobile phone device 125 associated with the username. A 2FA response is transmitted from the mobile phone 125 to login device 110 as depicted at 130A. For example, the challenge may be a text message that provides a 4 digit code that the user reads on the display of the mobile phone 125 and then manually enters the 4 digit code at the login device 110 as the response. Alternatively, the mobile phone may automatically transmit the response to the login device 110. The login device 110, in turn, communicates the response to web server 105, as depicted at 130B. Alternatively, the 2FA response may be transmitted from the mobile phone 125 to web server 105 directly, bypassing login device 110. In any case, if a correct response is received by web server 105 within a given time window (say, 30 seconds), as depicted by check mark 131, the web server 105 accepts or admits the user login, as depicted at 135, into the website or application and the user that logged in is trusted to possess the enrolled mobile device. If an incorrect response is received from login device 110 or web server 105, or if a correct response is received outside of a time-out window, the web server 105 rejects the user's login attempt, as depicted at 135.

The challenge 120 and the response 130A/130B can take three possible forms in 2FA schemes such as Duo Mobile, all involving user effort:

1. The challenge is a push notification to the Duo Mobile app on the enrolled mobile phone, and the response corresponds to the user's manual approval, which is then submitted by Duo Mobile to the web server via a secure channel.

2. The challenge is a prerecorded phone call to the enrolled mobile phone, and the response corresponds to the user pressing a key according to the voice instruction. The phone call and user response are both transmitted via a secure cellular channel.

3. The challenge and response are the same passcode the user must type in manually on the browser interface. The passcode can be generated by the web server and texted to the registered mobile phone device; it can also be generated by the user pressing a button in the Duo Mobile app on the mobile phone.

Duo also supports devices other than smartphones. For example, a user can enroll a tablet and install Duo Mobile on it, in which case the second authentication method above does not apply. Embodiments of the invention support tablets as well and aim at easy integration with Duo Mobile and other similar 2FA schemes. Other devices supported by Duo—such as hardware tokens, landline phones, and non-smart phones—are outside the scope of the embodiments.

2.2 Adversary Model

Embodiments of the invention aim to enhance the usability of commercially available mobile 2FA solutions rather than completely replacing them, so the embodiments adopt the following assumptions as in the prior art that targets zero-effort (no user input required) 2FA interactions between the user's mobile device and the user's login device:

1. The adversary/attacker has compromised the victim's (user's) username and password, with which the adversary attempts to log into the victim's web services account via a web browser on an arbitrary networked login device.
2. The attack is successful if the web server is convinced that the adversary has the enrolled mobile phone associated with the username.
3. The login browser is a standard browser such as Google's Chrome or Mozilla's FireFox and is assumed to be secure (e.g., uses a secure communication link and protocol over which data is sent between the browser and the website the browser is connected to, e.g., uses Hyper Text Transfer Protocol Secure (HTTPS), etc.).
4. In addition, the browser-server communication channel is secured using traditional TLS-like mechanisms, and so is the channel between the enrolled mobile phone and the web server.
5. Furthermore, the legitimate user always possesses their enrolled mobile phone where the installed 2FA app, like Duo Mobile, is not compromised.

When a zero-effort mobile 2FA solution such as in the prior art is employed, a login attempt (legitimate or not) will trigger an automatic 2FA response from the enrolled mobile phone, which makes the following Man-in-the-Middle (MiM) and co-located attacks possible.

Figure 2:
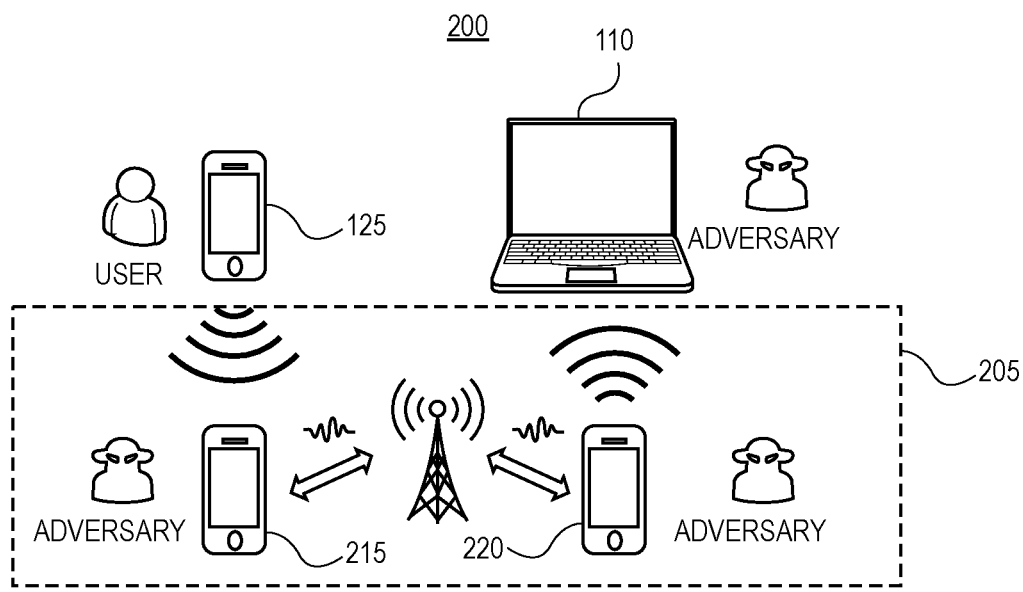
FIG. 2 illustrates a Man-in-the-middle (MiM) attack.

Man-in-the-Middle (MiM) attack: FIG. 2 illustrates the MiM attack 200, in which the adversary is far from the victim and the victim's enrolled mobile phone 125. But the adversary sets up a high-speed, invisible channel 205 between the victim's enrolled mobile phone 125 and the adversary's login device 110, e.g., by having an accomplice or hidden eavesdropping device 215 near the victim's enrolled mobile phone. When the adversary attempts to log in, the web server triggers the enrolled mobile phone to generate an automatic 2FA response which is captured and relayed in real time to the adversary's login device 110 via the adversarial channel 205.

Figure 3:
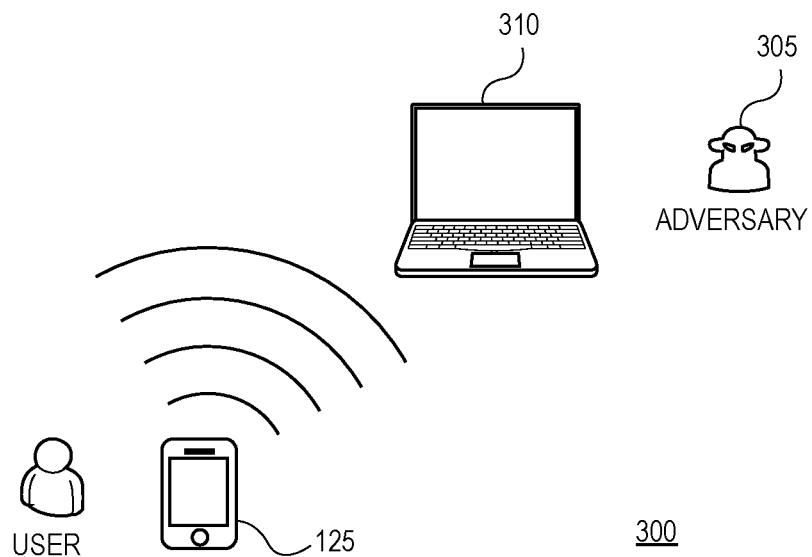
FIG. 3 illustrates a co-located attack.

Co-located attack 300: As shown in FIG. 3, the adversary 305, and in particular, the adversary's own login device 310, in this scenario is physically co-located with the victim such as in a library, a bar, a train, a plane, a campus cafeteria, or other often crowded public venues. The adversary's attempted login triggers an automatic response from the victim's enrolled mobile phone 125, which can be directly received by the adversary's login device 310, instead of the victim's login device 110.

The web server 105 considers that the enrolled mobile phone 125 is near the login device and then admits the adversary by mistake under both MiM and co-located attacks. The prior art cannot deal with MiM and co-located attacks. In contrast, embodiments of the invention are designed to thwart them.

More traditional attacks on mobile 2FA systems are beyond the scope of embodiments of the invention, for example, the losses of enrolled mobile phones, or Denial of Service (DoS) attacks in which the adversary only wants to induce endless interactions between the enrolled mobile phone and the web server instead of logging into the victim's account.

3. Embodiments of the Invention

The description below provides an overview of embodiments of the invention and then each component is described in further detail.

3.1 Overview

Figure 17:
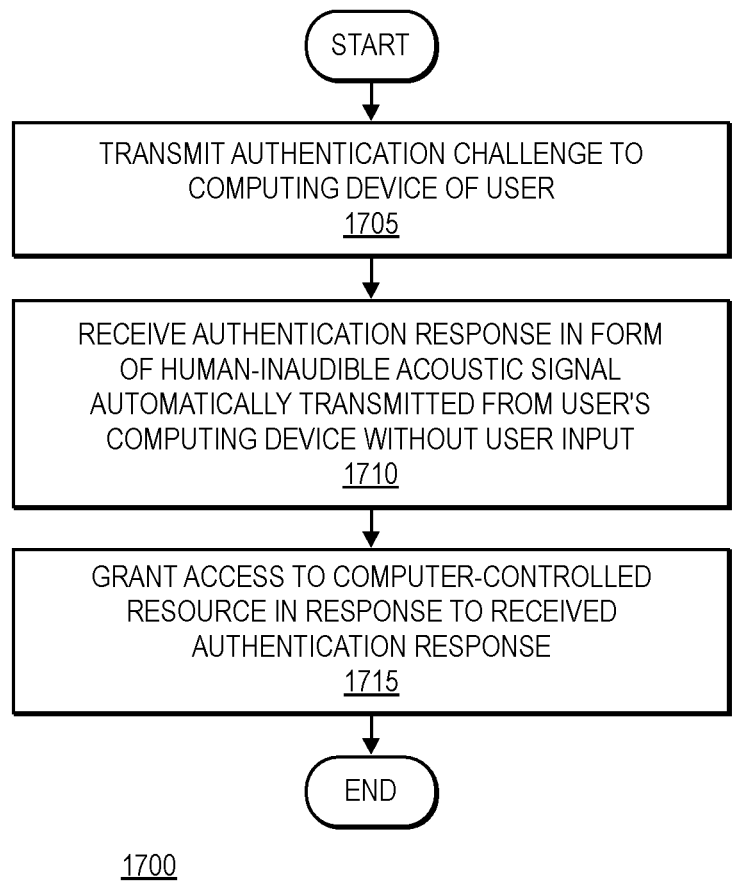
FIG. 17 is a flowchart of an embodiment of the invention.

In general terms, and with reference to FIG. 17, an embodiment of the invention 1700 involves logic to allow a user access to a computer-controlled resource. The logic first transmits an authentication challenge to a computing device of the user, at 1705. The logic then receives an authentication response in the form of a human-inaudible acoustic signal automatically transmitted from the computing device, and without prompting or receiving input from the user, at 1710. In one embodiment, the human-inaudible acoustic signal automatically transmitted from the computing device is an OFDM-modulated acoustic signal. In one embodiment, an error-correction encoding scheme is applied to the OFDM-modulated acoustic signal. For example, a Reed-Solomon encoding scheme is used. The logic allows access to the computer-controlled resource when the received authentication response is confirmed as correct, at 1715.

Further embodiments of the invention aim to eliminate user-mobile phone interactions in mobile 2FA. To achieve this goal, embodiments expect the user response in each of the three authentication methods described above in Section 2.1 transmits some information to the server for verification. Embodiments refer herein to such user information as the 2FA response for convenience. For example, in the third authentication method described in section 2.1, the 2FA response comprises a passcode, or in the first and second Duo authentication methods, some unforgeable data incurred by the legitimate user's approval of the login attempt. Zero user-mobile phone interaction can thus be achieved by automatically generating and transmitting the 2FA response to the web server.

Embodiments may involve the enrolled mobile phone transmitting the 2FA response to the web server directly via a Wi-Fi or cellular Internet link or indirectly through the login device/web browser. The direct approach is simple and straightforward, but vulnerable to both MiM and co-located attacks. One embodiment, therefore, is the indirect approach (as illustrated in FIG. 1) and the development of effective countermeasures against MiM and co-located attacks, with which an access control device, such as the login device/web browser, can check whether the 2FA response indeed comes from the user's computing device, e.g., an enrolled mobile phone, nearby the access control device.

There are a variety of communication interfaces that embodiments of the invention may use for zero user effort mobile phone-login device/web browser communications. Smartphones of course have Bluetooth and Wi-Fi interfaces as well as microphones and speakers, and so do most modern login devices such as tablets, desktop computers, and laptops. Prior art efforts use unpaired Bluetooth communication, but these schemes require the web browser to expose a Bluetooth API that is not currently available in any standard browser. The mobile phone and the web browser can also communicate over Wi-Fi, but need to be on the same Wi-Fi network. In addition, Wi-Fi and Bluetooth communication ranges are relatively large, making it much harder to defend against co-located attacks. So preferred embodiments utilize speakers and/or microphones for acoustic communications between the web-browser and the mobile phone.

Figure 18A:
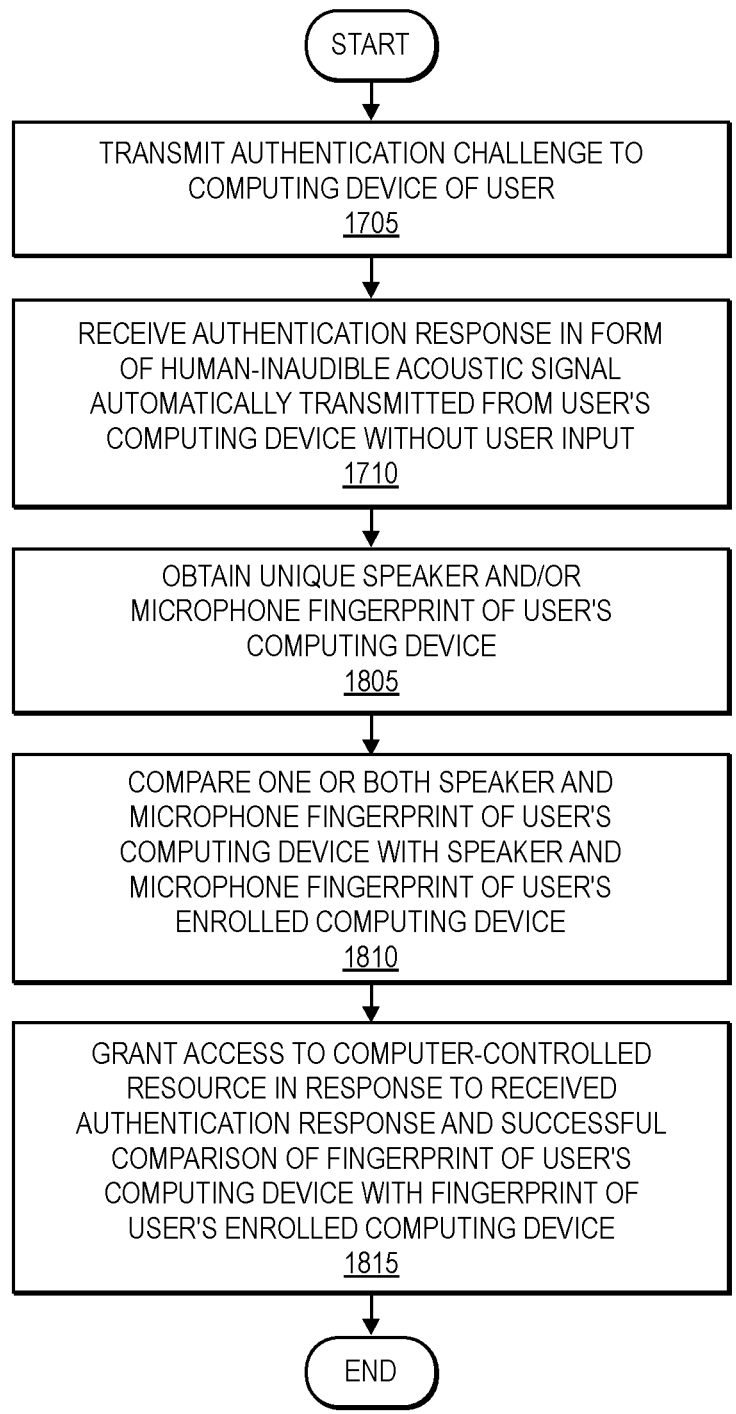
FIG. 18A is a flowchart of an embodiment of the invention.

In general terms, and with reference to FIG. 18A, an embodiment of the invention 1800 prevents a man-in-the-middle attack during multi-factor authentication. The embodiment involves logic to allow a user access to a computer-controlled resource. The logic first transmits an authentication challenge to a computing device of the user, at 1705. The logic then receives an authentication response in the form of a human-inaudible acoustic signal automatically transmitted from the computing device, and without prompting or receiving input from the user, at 1710. In an alternative embodiment, the authentication response may not be automatic but may be manual—that is, require user input. Logic then obtains a unique speaker and/or microphone fingerprint of a user's computing device at 1805. Once obtained, logic 1810 compares the obtained one or both of the unique speaker fingerprint and the unique microphone fingerprint of the computing device to a previously obtained (and permanently stored) one or both of the unique speaker fingerprint and the unique microphone fingerprint of the computing device of the user. Logic at 1815 allows access to the computer-controlled resource in response not only to the received authentication response but further in response to the comparison of the obtained one or both of the unique speaker fingerprint and the unique microphone fingerprint of the computing device with the previously obtained one or both of the unique speaker fingerprint and the unique microphone fingerprint of the computing device of the user. In particular, if the obtained fingerprint(s) match the previously obtained fingerprint(s) then the user of computing device from which the current fingerprint was obtained is considered an authorized user and access to the computing resource is allowed.

Further embodiments of the invention leverage speaker and/or microphone fingerprints in the enrolled mobile phone to counteract the MiM attack. In particular, each speaker is unique, even when the model of phone is identical and uses the same speaker components, due to manufacturing variances or imperfections, and so is the case with each microphone. Thus, the acoustic signals produced by each speaker or microphone are unique and can be treated as a signature that uniquely identifies a particular mobile phone, and are referred to herein as a mobile device's speaker fingerprint and microphone fingerprint. In embodiments, the web server stores the speaker and microphone fingerprints of each enrolled mobile phone, which can be periodically refreshed, e.g., to account for device aging, or updates to the device, whether hardware, firmware, or software updates. After verifying the 2FA response from a mobile device—referred to as a prover phone—purportedly the enrolled mobile phone, the login device/web-browser further involves a novel protocol according to embodiments of the invention to extract the speaker fingerprint and/or microphone fingerprint of the prover phone. If one or both of the extracted fingerprints match stored copies accessible to the web server, the web server considers that the 2FA response was not subject to the MiM attack. While there is prior art that identifies smartphones with acoustic hardware fingerprints, each extracted fingerprint is actually tied to a pair of a recording microphone at the smartphone and an emitting speaker at the login device, or a pair of the recording microphone at the login device and the emitting speaker at the smartphone. If these schemes were directly applied to 2FA, the web server would need to extract the acoustic fingerprint associated with the enrolled mobile phone and every possible login device that the legitimate user may use, which requires significant processing, communication, and storage resources. In contrast, embodiments of the invention utilize a fingerprinting protocol that allows extracting an individual speaker fingerprint and/or an individual microphone fingerprint of just the prover phone, thus making more efficient use of processing, communication, and storage resources needed to perform 2FA.

Figure 18B:
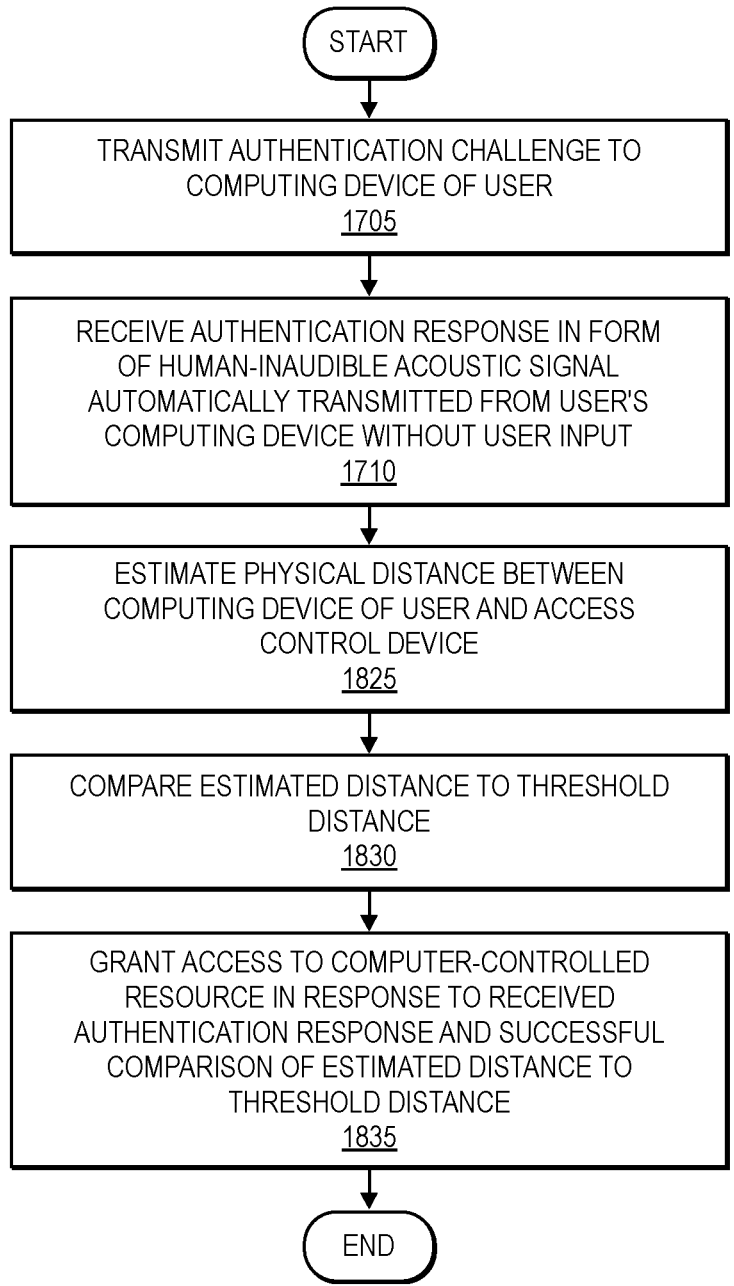
FIG. 18B is a flowchart of an embodiment of the invention.

In general terms, and with reference to FIG. 18B, an embodiment of the invention 1820 prevents a co-located attack during multi-factor authentication. The embodiment involves logic to allow a user access to a computer-controlled resource. The logic first transmits an authentication challenge to a computing device of the user, at 1705. The logic then receives an authentication response in the form of a human-inaudible acoustic signal automatically transmitted from the computing device, and without prompting or receiving input from the user, at 1710. In an alternative embodiment, the authentication response may not be automatic but may be manual—that is, require user input. Logic 1825 then estimates a physical distance between the computing device of the user and an access control device through which the user is to access to the computer-controlled resource. Logic 1830 then compares the estimated distance to a threshold distance and logic 1835 allows access to the computer-controlled resource in response to the received authentication response and if there is a successful comparison of the estimated distance to the threshold distance. For example, if the estimated distance is less than the threshold distance, the computing device is assumed to be a legitimate user's computing device, e.g., mobile phone, and not an adversary's mobile computing device.

According to an embodiment, estimating the physical distance between the computing device of the user and the access control device comprises transmitting acoustic signals via respective speakers from the computing device and the access control device at respective first points in time, receiving the acoustic signals via respective microphones at the computing device and the access control device at respective second points in time, and estimating the physical distance between the computing device and the access control device given the time lapse, or elapsed time, between the transmission of the acoustic signals at the first points in time and the reception of the acoustic signals at the respective second points in time.

Embodiments thwart the co-located attack by acoustic distance ranging. More specifically, while extracting the speaker and microphone fingerprints of the prover phone, the login device/web-browser further measures the distance from the login device/web-browser to the prover phone by exchanging a few acoustic signals and measuring, for example, the round-trip delay to exchange such signals. In an alternative embodiment, the login device/web-browser measures the distance between the login device and the prover phone by exchanging a few acoustic signals independent of, that is, not while, extracting the speaker and microphone fingerprints of the prover phone. If the estimated distance (e.g., average round trip delay time) is above a chosen (e.g., web services app-chosen, web-browser user-chosen) safety (time) threshold, the login device/web-browser treats the login and associated 2FA attempt as a co-located attack.

In one embodiment, the web server only admits the attempted user when the 2FA response, the speaker and/or microphone fingerprints, and the distance measurement all pass verifications. Otherwise, it fails to admit the attempted login, or invokes the traditional mobile 2FA process as the fallback. In another embodiment, the web server admits the attempted user when the 2FA response and one or more of: the speaker fingerprint, the microphone fingerprint, and the distance measurement, pass verification.

3.2 Acoustic Transmission of 2FA Response

Further embodiments transmit the 2FA response via acoustic signals emitted by the enrolled mobile phone's speaker and received by the login device's microphone. Note that login devices or web browsers executing thereon can access the login device's speaker and microphone via the standard Web Audio API. Embodiments use OFDM-based acoustic signals to provide reliable service even in the event of severe channel conditions. While the embodiments described herein refer to authenticating a user before allowing the user to access a computing resource such as a web server or application executing thereon, it is appreciated that the authentication techniques described herein may be used to allow access to, or through, any computer controlled device or resource, such as a user's online banking account website or a cloud computing service provider's application, and access to, or through computer controlled physical structures as well, such as a house, building, door, gate, window, vault, safe-deposit box, with smart locking/unlocking features, etc.

3.2.1 OFDM-Based Acoustic Transmission

Embodiments use high-frequency inaudible signals to avoid disturbing users and also exploit the fact that the high-frequency band is usually very quiet in various environments. Embodiments of the invention and experiments that confirmed the viability of the embodiments use the frequency band between 18 kHz and 20 kHz, which is thus used in the subsequent illustrations herein as an example. Embodiments divide [18, 20] kHz into 20 non-overlapping sub-channels with each spanning 100 Hz. The OFDM sub-carrier frequencies are $f_m=18+0.1$ m kHz for $m \in [1, 20]$. Embodiments of the invention use On-Off Keying as the modulation scheme for its simplicity, and the mobile phone generates the n-th ($n \geq 1$) time-domain sample as $$x_n = A \sum_{m=1}^{20} X_m \cos(2\pi n f_m), \quad (1)$$

where A denotes the signal amplitude, and $X_m$ is the m-th binary bit to transmit. $x_n$ is sent via the mobile phone speaker.

After receiving $x_n$ via its microphone, the login device/web-browser performs a Fast Fourier transform (FFT) to extract the amplitude of each sub-carrier signal component, denoted by $I_m$ for sub-carrier $f_m$. Since no signal is transmitted at 18 kHz, embodiments of the invention denote the signal amplitude detected at 18 kHz by $I_O$ and use it as a reference. The login device/web-browser then decodes $X_m$ by comparing $I_m$ with $I_O$. If the difference between $I_m$ and $I_O$ exceeds a predefined system threshold (e.g., 10 dB in the experiments), $X_m$ is decoded as bit-1 and otherwise bit-0.

3.2.2 Packet Format for 2FA Response

Embodiments construct a virtual packet from the 2FA response, which consists of a preamble followed by data segments. The preamble is to help the login device/web-browser locate the beginning of the virtual packet. Embodiments of the invention use a chirp signal (20 ms long in the experiments) from 17 kHz to 19 kHz as the preamble. A silence period (20 ms in the experiments) is also added after the preamble to avoid interference with the following data segment. Embodiments may also apply a Reed-Solomon (RS) code to encode the raw 2FA response to mitigate transmission errors. The RS-coded 2FA response is further divided into data segments of 20 bits with one for each OFDM sub-carrier. Each data segment is converted into an OFDM symbol of duration 10 ms, and a silence period of 10 ms is added between adjacent OFDM symbols to combat the inter-symbol-interference (ISI) and the multipath effect. Experiments found that the audio may be initially heavily distorted, so embodiments of the invention let the speaker send a random audio signal of 20 ms long before the preamble to "warm up" itself.

The performance of the 2FA transmission scheme in accordance with embodiments of the invention as set forth above can be briefly analyzed as follows. Assume that the RS-coded 2FA response is L bits, where L is an integer multiple of 20 after possible padding. It takes $20+20+20+10*L/20+10*(L/20-1)=(50+L)$ ms to transmit one virtual packet, corresponding to an effective data rate of $L/50+L$ kb/s. Suppose that the virtual packet can be successfully decoded with probability p. The mobile phone speaker keeps sending the virtual packet for $m \geq 1$ times, where m is a system parameter. If the login device/web-browser still cannot successfully decode a virtual packet with probability $(1-p)^m$, it notifies the web server, which then takes an action, such as invoking a traditional mobile 2FA authentication method.

3.3 Acoustic Fingerprinting

Embodiments of the invention present below a novel technique for the login device/web-browser to extract the speaker and/or microphone fingerprints of the prover phone which purports to be the enrolled mobile phone.

3.3.1 Background on Acoustic Fingerprinting

Figure 4:
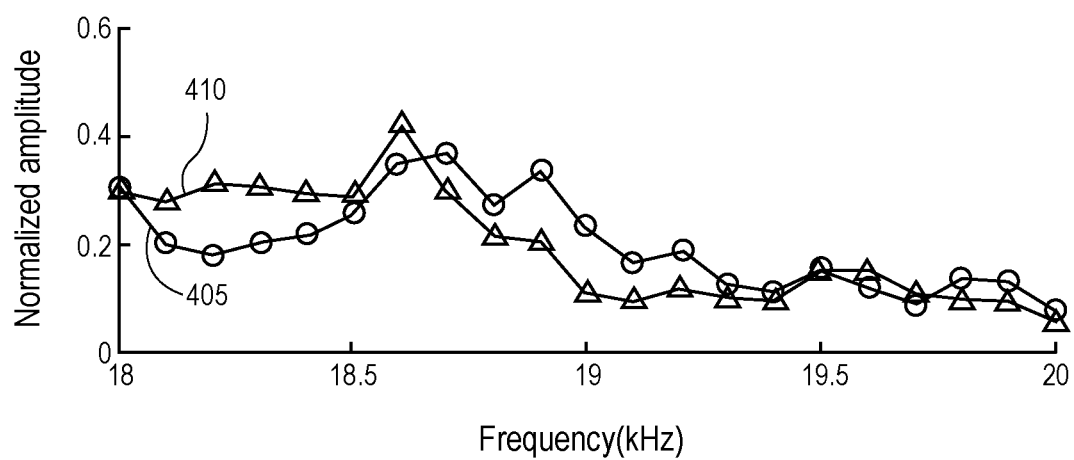
FIG. 4 depicts the frequency response curves of a mobile-phone speaker on a Samsung Galaxy S5, measured by two Nexus 7.

The feasibility of speaker and microphone fingerprinting is rooted in the imperfect manufacturing process that introduces unique mechanical and electronic features into each speaker (or microphone). So each speaker (or microphone) has a unique frequency response which measures the gain or attenuation at each frequency and can identify the mobile device in which the speaker or microphone is installed. The prior art explores the frequency response as a hardware fingerprint to identify a smartphone, but the extracted frequency response is associated with a speaker-microphone pair (i.e., the emitting speaker of one device and the recording microphone of the other device) rather than with only an individual speaker or microphone of the one device, e.g., a mobile computing device such as a mobile phone. Embodiments of the invention highlight this issue with a simple experiment. FIG. 4 shows the frequency responses of the emitting speaker on a Samsung Galaxy S5 smartphone, measured by the recording microphones on two respective Nexus 7 tablet computers with prior art methods. As can be seen, the two microphones yield very different frequency responses 405 and 410 for the same mobile phone speaker.

The above observation matters because in the mobile 2FA context, the speaker is on the enrolled mobile phone, while the microphone is on any arbitrary access control device, e.g., a login device, available to the user (e.g., a personal computer or a shared, public device, such as one in a library). If embodiments of the invention were to use the same prior art methods to identify the enrolled mobile phone, the extracted frequency response would be tied to the speaker of the enrolled mobile phone and the microphone of a particular login device. It follows that the online system must then obtain the frequency response associated with the enrolled mobile phone and every possible login device the user may use in the enrollment phase, which would use excessive amounts of processing, communication, and data storage resources, making the prior art approach highly unrealistic as a commercially viable solution.

3.3.2 Fingerprinting Technique According to Embodiments of the Invention

Figure 19A:
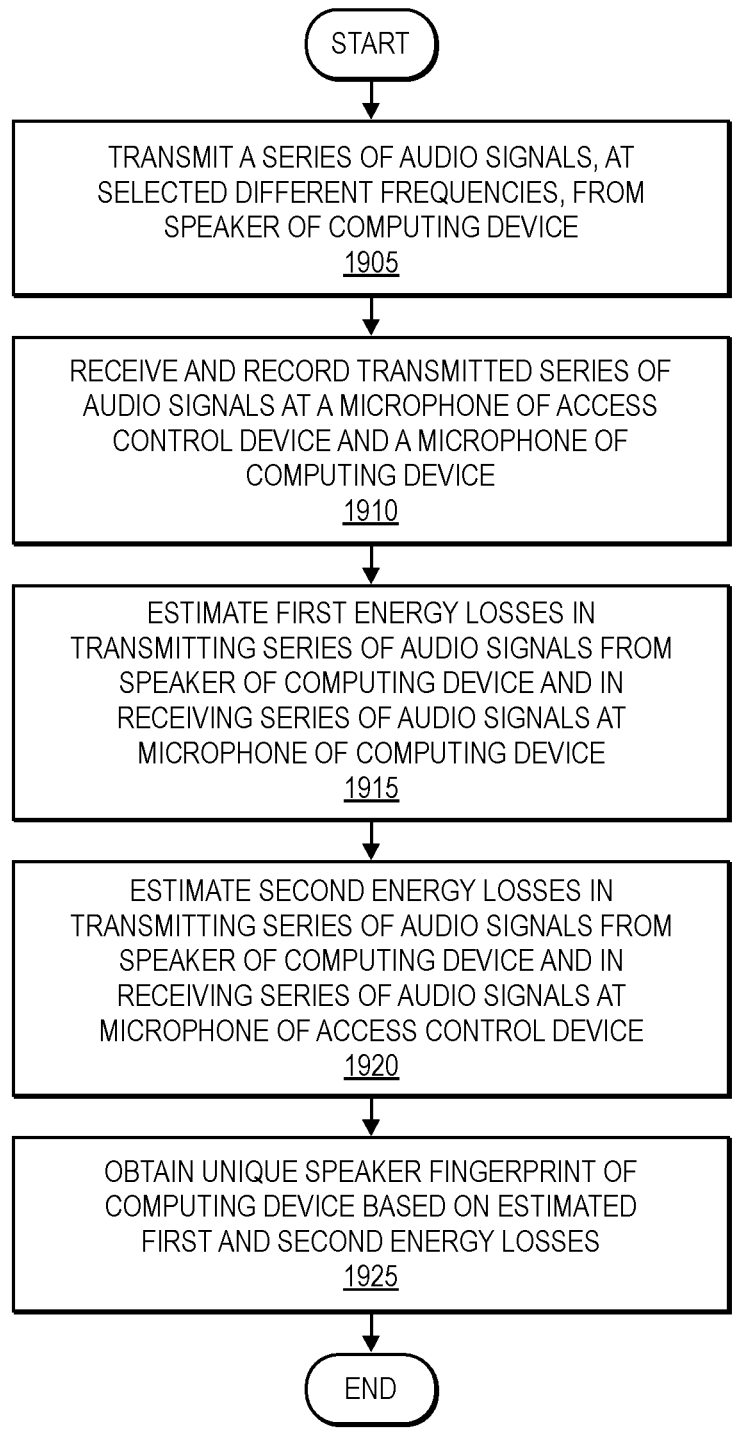
FIG. 19A is a flowchart of an embodiment of the invention.

In general terms, and with reference to FIG. 19A, an embodiment of the invention 1900 involves logic to allow a user access to a computer-controlled resource. The logic at 1905 first transmits a first series of audio signals, each at different frequencies, from a speaker of the computing device. Logic 1910 receives, and records in respective data storage, the first series of transmitted audio signals at a microphone of an access control device, and the first series of transmitted audio signals at a microphone of the computing device. Logic 1915 then estimates a first series of energy losses associated with transmitting the first series of audio signals, each at different frequencies, from the speaker of the computing device, and a counterpart series of energy losses associated with receiving the first series of transmitted audio signals at the microphone of the computing device.

Logic 1920 likewise estimates a second series of energy losses associated with transmitting the first series of audio signals, each at different frequencies, from the speaker of the computing device, and a counterpart series of energy losses associated with receiving the first series of transmitted audio signals at the microphone of the access control device. At 1925, the logic obtains the unique speaker fingerprint of the computing device based on the above mentioned estimated series of energy losses.

In one embodiment, estimating the first series of energy losses comprises estimating the received audio signal power at each of the different frequencies for the received first series of transmitted audio signals recorded at the computing device, based on a transmission power at which the first series of audio signals are transmitted, an energy loss due to the speaker of the computing device, and an energy loss of the microphone of the computing device. Likewise, in the embodiment, estimating the second series of energy losses comprises estimating the received audio signal power at each of the different frequencies for the received first series of transmitted audio signals recorded at the access control device based on a transmission power at which the first series of audio signals are transmitted, an energy loss due to the speaker of the computing device, and an energy loss of the microphone of the access control device.

Figure 19B:
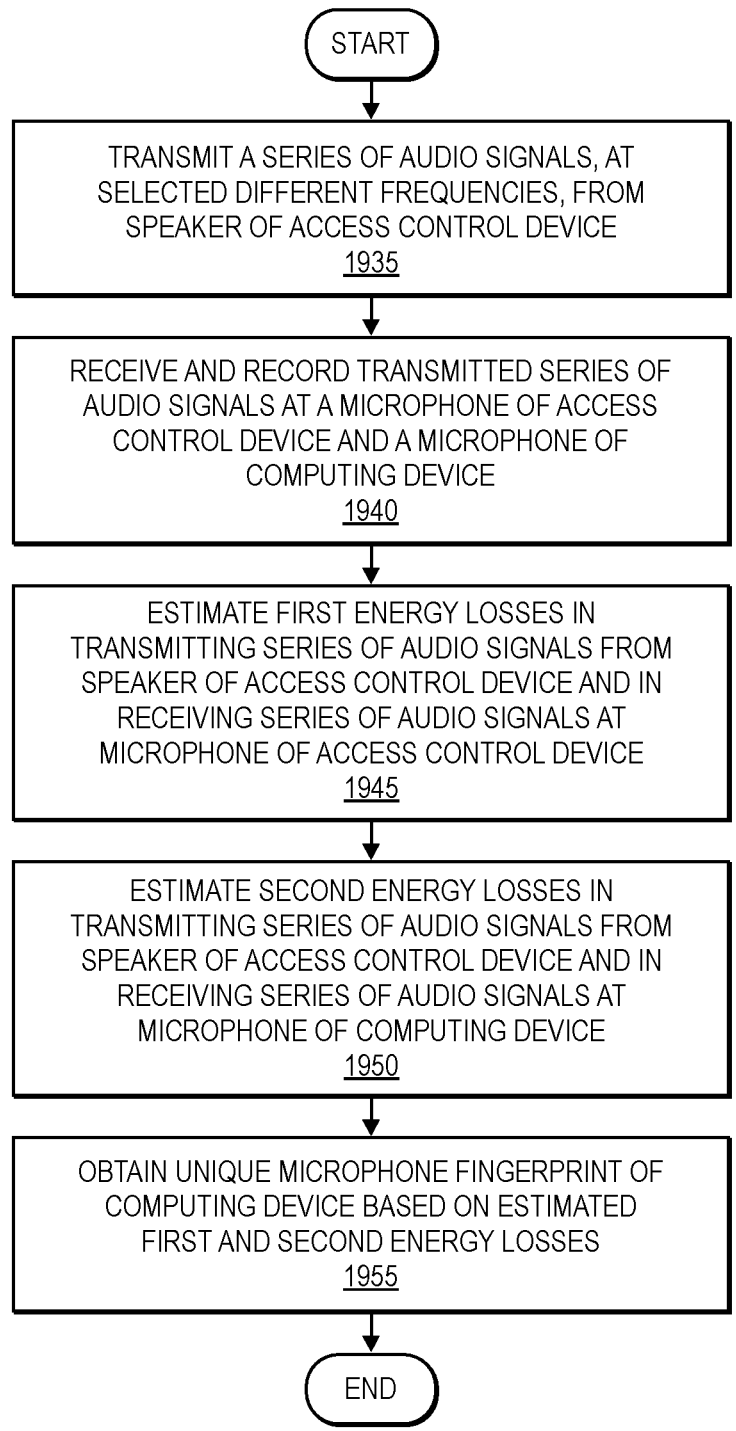
FIG. 19B is a flowchart of an embodiment of the invention.

In general terms, and with reference to FIG. 19B, an embodiment of the invention 1930 involves logic to obtain a unique speaker fingerprint of a computing device. Logic at 1935 transmits a first series of audio signals, each at different frequencies, from a speaker of the access control device. Logic at 1940 then receives, and records, the first series of transmitted audio signals at a microphone of the access control device, and receives and records the same signals at a microphone of the computing device. Logic 1945 estimates a first series of energy losses associated with transmitting the first series of audio signals, each at different frequencies, from the speaker of the access control device and a counterpart series of energy losses associated with receiving the first series of transmitted audio signals at the microphone of the access control device. Likewise, logic 1950 estimates a second series of energy losses associated with transmitting the first series of audio signals, each at different frequencies, from the speaker of the access control device and the counterpart series of energy losses associated with receiving the first series of transmitted audio signals at the microphone of the computing device. Logic 1955 then obtains the unique microphone fingerprint of the computing device based on the estimated first and second series of energy losses.

In one embodiment, the logic for estimating the first series of energy losses comprises logic for estimating the received audio signal power at each of the different frequencies for the received first series of transmitted audio signals recorded at the access control device based on a transmission power at which the first series of audio signals are transmitted, an energy loss due to the speaker of the access control device, and an energy loss of the microphone of the access control device. Likewise, the logic for estimating the second series of energy losses comprises logic for estimating the received audio signal power at each of the different frequencies for the received first series of transmitted audio signals recorded at the computing device based on a transmission power at which the first series of audio signals are transmitted, an energy loss due to the speaker of the access control device, and an energy loss of the microphone of the computing device.

Fingerprinting technique according to further embodiments of the invention explores the following acoustic propagation model for frequency f:

$$P(f,x) = L(f)L'(f)P_0(f)e^{\lambda(x)} + \text{noise} \qquad (2)$$

where $P_0(f)$ represents the transmitted signal power, $P(f,x)$ denotes the received signal power at distance x from the speaker, $L(f)$ and $L'(f)$ denote the energy loss due to the emitting speaker and recording microphone, respectively, and $\lambda(x)$ is a function of x that can be obtained by fitting measurement data.

The above propagation model can be further simplified, thereby reducing CPU processing cycles, acoustic signal transmission and processing, as well as data storage requirements. In particular, embodiments of the invention utilize a fingerprinting process that can be done within a few tens of milliseconds during which the ambient noise is very unlikely to significantly change. The prover phone initiates the fingerprinting process by emitting a chirp signal from its speaker for synchronization as in Section 3.2. It is followed by a silence period of 10 ms, during which neither the prover phone nor the login device/web-browser transmits. The silence period is equivalent to $P_0(f)$ equal to zero, allowing the prover phone and the login device/web-browser to estimate the ambient noise and subtract it from Eq. (2). Experiments showed that the ambient noise is insignificant at frequencies above 18 kHz. Further experiments were conducted to evaluate the signal to noise ratio (SNR) in a noisy coffee house. In such experiments, the volume of a Samsung Galaxy S5 mobile phone was set to 30 percent of its maximum volume and a flat stimulation (to be explained shortly) was used as the input to its speaker. Another Samsung Galaxy S5 mobile phone was placed half a meter away (the expected maximum safe working distance of certain embodiments), to record the audio. The experiments found that the received audio signal power is more than 20 dB higher than the ambient noise.

Either case above allows refining the acoustic propagation model as:

$$P(f,x) \approx L(f)L'(f)P_0(f)\beta e^{\lambda(x)}. \qquad (3)$$

Embodiments of the invention use an interactive protocol for the login device/web-browser to extract the emitting speaker and recording microphone fingerprints of the prover phone. Embodiments of the invention use a flat stimulation as the input to the speakers of both the prover phone and the login device. The flat stimulation is composed of 20 sine waves whose frequencies range from 18.1 kHz to 20 kHz in an equal increase of 0.1 kHz. In particular, the speaker of the prover phone generates an audio to the flat stimulation, which is recorded by the microphones on both the prover phone and the login device; then the speaker of the login device generates an audio to the flat stimulation, which is recorded by the microphones on both the prover phone and the login device as well. Let D denote the prover phone and B the login device. Use $P_{XY}(f)$ to denote the received power at frequency f of the audio signal emitted by device X and recorded by device Y, where device X and device Y can be either of B and D. Then, embodiments use the following equations $$P_{DD}(f) = L_D(f)L'_D(f)P_D(f)e^{\lambda(x_{DD})}, \qquad (4)$$

$$P_{DB}(f) = L_D(f)L'_B(f)P_D(f)e^{\lambda(x_{DB})}, \qquad (5)$$

$$P_{BB}(f) = L_B(f)L'_B(f)P_B(f)e^{\lambda(x_{BB})}, \qquad (6)$$

$$P_{BD}(f) = L_B(f)L'_D(f)P_B(f)e^{\lambda(x_{BD})}, \qquad (7)$$

where $P_X$ is the transmission power at frequency f on device X, and $x_{XY}$ denotes the distance between the speaker of device X and the microphone of device Y.

Each enrolled mobile phone can be uniquely identified by a vector of $L_D(f)$ and $L'_D(f)$ values for each frequency f in the flat stimulation. Directly obtaining $L_D(f)$ and $L'_D(f)$ involves estimating $P_D(f)$, $P_B(f)$, $X_{DD}$, $X_{DB}$, $X_{BB}$, and $X_{BD}$. One embodiment uses a technique to avoid the error-prone parameter estimation. Let the signal measurements at a reference frequency 18 kHz be denoted by $R_{DD}$, $R_{DB}$, $R_{BB}$, and $R_{BD}$, respectively. The embodiment further uses $l_X$ and $l'_X$ to denote the energy loss of the speaker and microphone of device X at 18 kHz, respectively. Then embodiments have $$R_{DD} = l_D l'_D P_D e^{f(X_{DD})}, \qquad (8)$$

$$R_{DB} = l_D l'_B P_D e^{f(X_{DB})}, \qquad (9)$$

$$R_{BB} = l_B l'_B P_B e^{f(X_{BB})}, \qquad (10)$$

$$R_{BD} = l_B l'_D P_B e^{f(X_{BD})}, \qquad (11)$$

By combining Equations (4) to (11), embodiments have $$P_{DD}(f)/R_{DD} = (L_D(f)/l_D)(L'_D(f)/l'_D), \qquad (12)$$

$$P_{DB}(f)/R_{DB}(L_D(f)/l_D)(L'_B(f)/l'_B), \qquad (13)$$

$$P_{BB}(f)/R_{BB}(L_B(f)/l_B)(L'_B(f)/l'_B), \qquad (14)$$

$$P_{BD}(f)/R_{BD}(L_B(f)/l_B)(L'_D(f)/l'_D), \qquad (15)$$

The prover phone reports its signal measurements $P_{DD}(f)$, $P_{BD}(f)$, $R_{DD}(f)$, and $R_{BD}(f)$ to the login device/web-browser. By solving these equations, the login device/web-browser obtains $S_i(f)=L_D(f)/l_D$ and $M_i(f)=(L'_D(f)/l'_D)$, based on which it obtains two 20-dimension vectors, denoted by S and M for the prover phone's speaker and microphone, respectively. Then embodiments normalize S and M as $$\hat{S} = \frac{S}{\sqrt{\sum_{f \in \{18.1, 18.2, \ldots, 20\}kHz} S_i^2(f)}}, \quad (16)$$

$$\hat{M} = \frac{M}{\sqrt{\sum_{f \in \{18.1, 18.2, \ldots, 20\}kHz} M_i^2(f)}}, \quad (17)$$

The above fingerprinting process can be executed multiple times to improve estimate accuracy, in which case the login device/web-browser uses the concatenation of average $\hat{S}$ and $\hat{M}$ as the acoustic fingerprint of the prover phone. If the Euclidean distance between the collected and legitimate acoustic fingerprints is above a threshold τ, the prover phone is considered an imposter and rejected access to the web services or application. The online system can obtain the parameter τ using machine learning algorithms.

3.4 Cross-Device Distance Ranging

Embodiments of the invention estimate the physical distance between the prover phone and the access control device, e.g., the login device, to withstand a co-located attack. This embodiment assumes that users normally keep their phones closer to themselves than anyone else, especially in a crowded public environment (e.g., a library or cafeteria) where the co-located attack is more likely to occur. So the distance between the enrolled mobile phone and the login device of the co-located attacker should be sufficiently larger than that between the enrolled mobile phone and the login device (e.g., a desktop PC with a web-browser executing thereon to provide access to a computing resource or application, such as a web server application) of the legitimate user.

There are prior-art cross-device ranging methods. For example, Frequency Modulated Continuous Waveform (FMCW) has been used to accurately measure the distance between two synchronized devices. However, cross-devices synchronization is non-trivial. Even a small synchronization deviation of 1 ms will lead to a measurement error of 30 cm. A known variation of FMCW does not require cross-device synchronization; but this method is designed for devices equipped with at least two speakers, which are not available on many commercial, off-the-shelf (COTS) mobile phones and tablets.

Figure 5:
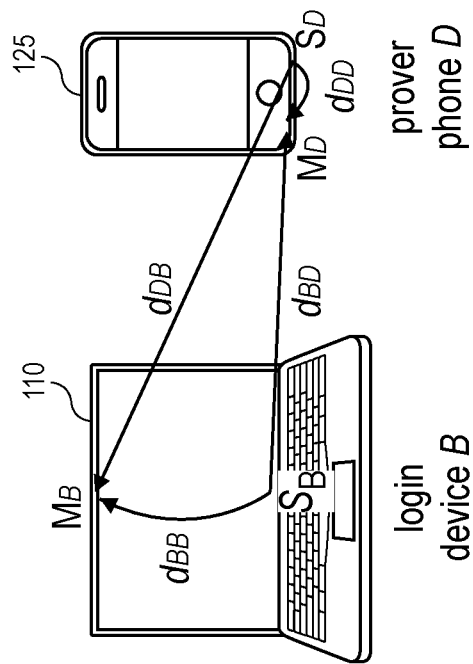
FIG. 5 is an illustration of two-way acoustic ranging.
Figure 5:
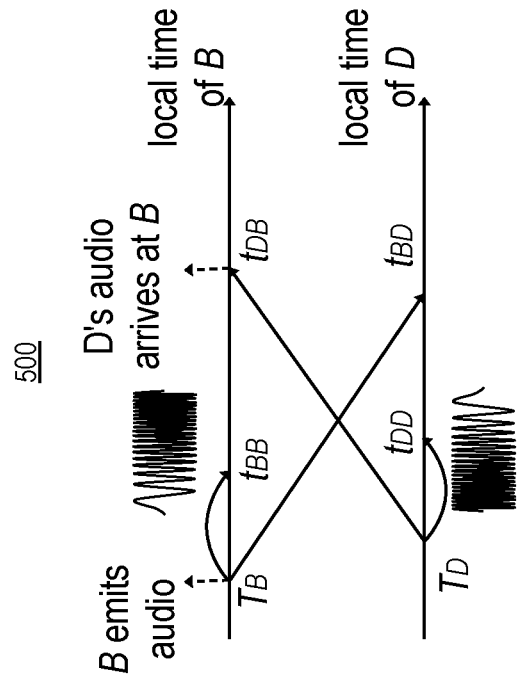

Embodiments of the invention leverage a known two-way sensing method to measure the distance between two devices, without the need for cross-device synchronization, and which only requires that both the login and mobile phone devices each have one speaker and one microphone. Almost all COTS smartphones, tablets, laptops, and all-in-one PCs fulfill this requirement. FIG. 5 illustrates the process of the two-way ranging method 500. The embodiments assume that device D is the prover phone 125 with microphone $M_D$ and speaker $S_D$, and device B is the login device 110 with microphone $M_B$ and speaker $S_B$.

The distance ranging process involving B and D both transmitting and receiving audio signals. Specifically, B sends short audios via $S_B$ at time $T_B$, and so does the prover phone D via $S_D$ at time $T_D$. Meanwhile, both $M_B$ and $M_D$ start audio recording. Then B analyzes the audio recorded by $M_B$ to derive the arrival time of its own audio and D's audio, denoted by $t_{BB}$ and $t_{DB}$, respectively. Similarly, D derives $t_{BD}$ and $t_{DD}$ by analyzing the audio recorded by $M_D$. The speed of sound is denoted by c and the distance between device X's speaker and device Y's microphone by $d_{XY}$. The following equations are then obtained, $$d_{BB} = c \cdot (t_{BB} - T_B), \quad (18)$$

$$d_{BD} = c \cdot (t_{DB} - T_B), \quad (19)$$

$$d_{DB} = c \cdot (t_{BD} - T_D), \quad (20)$$

$$d_{DD} = c \cdot (t_{DD} - T_D), \quad (21)$$

The distance $\bar{d}_{BD}$ between B and D is approximately equal to the average of $d_{BD}$ and $d_{DB}$.

$$D = \frac{1}{2} \cdot (d_{BD} + d_{DB})$$
$$= \frac{c}{2} \cdot ((t_{DB} - T_B) + (t_{BD} - T_D))$$
$$= \frac{c}{2} \cdot ((t_{DB} - t_{DD} - t_{BB} + t_{BD}) + (t_{BB} - T_B) + (t_{DD} - T_D))$$
$$= \frac{c}{2} \cdot ((t_{DB} - t_{DD}) - (t_{BB} - t_{BD})) + \frac{1}{2} \cdot (d_{BB} + d_{DD}),$$

where $d_{BB}$ is the distance between $S_B$ and $M_B$, and $d_{DD}$ is the distance between $S_D$ and $M_D$. The speaker-microphone distance is often fixed for a specific mobile device model and can be known by checking the hardware specification. If $\bar{d}_{BD}$ is within a selected, e.g., web services- or user-chosen, safe threshold (say, 0.5 m), the login device/web-browser can ascertain that no co-located attack is present with overwhelming probability.

Embodiments use chirp audio signals to address interference and overlap. In particular, B and D emit up-chirp and down-chirp signals, respectively. The high autocorrelation and low cross-correlation of down and up chirps allow both the login and mobile phone devices to distinguish the audios from each other. To detect the audio arrival time, each device calculates the correlation between recorded audio and reference chirp signals. The "peak" point indicates the accurate arrival time.

In some embodiments, the distance ranging and acoustic fingerprint procedures are conducted concurrently, or simultaneously, for purposes of efficiency. In doing so, embodiments can verify whether the ranging audio is from the enrolled mobile phone. The frequency of the chirp signals used for distance ranging is between 16.5 kHz and 17.5 kHz, according to one embodiment. The frequency of the acoustic fingerprinting audios is between 18 kHz and 20 kHz, according to one embodiment. In alternative embodiments, the procedures are performed sequentially, or only one of the procedures is performed.

4. Security Analysis

In this section, security of the embodiments of the invention are empirically analyzed.

4.1 Resilience to Fake and Replayed 2FP Responses

Traditional 2FP responses are built upon cryptographic security mechanisms and are naturally resilient to fake and replay attacks. For example, Duo uses HTOP, or HMAC-based one-time password (OTP), to generate passcodes for authentication, and each passcode is only valid for a very limited duration. After seeing the passcode, a user must type it manually to authenticate for access. Embodiments of the invention automatically transmit a 2FP response such a passcode via acoustic signals to eliminate user involvement. The 2FP response is cryptographically unforgeable and passed by the login device/web browser to the web server for final verification. Any fake or replayed 2FP response can be immediately detected, thus causing the denial of the attacker's access attempt. Embodiments thus inherit the resilience of existing mobile 2FP solutions to fake and replayed 2FP responses.

4.2 Resilience to MiM Attacks

The MiM attack corresponds to the strongest version of the replay attack. As shown in FIG. 2, a powerful adversary can place a malicious device near the victim, which can record and relay any audio from the victim's enrolled mobile phone in almost real time to the adversary who can then replay the audio to cheat the non-compromised login device/web browser. Embodiments of the invention leverage speaker and microphone fingerprints to defeat this powerful attack. Specifically, since the adversary has to replay the tunneled audio signal through their own login device, the login device/web browser would obtain the speaker and microphone fingerprints of the adversary's replaying device instead of the legitimate enrolled mobile phone. Such illegitimate acoustic fingerprints cannot pass the verification at the web server. Therefore, the MiM attack can be effectively thwarted. As a matter of fact, embodiments effectively add the acoustic fingerprint of an enrolled mobile phone as the third factor of authentication, which can enhance the security of existing mobile 2FA solutions. For example, an intercepted valid passcode is no longer sufficient for the adversary to log in with embodiments of the invention in place.

4.3 Resilience to Co-Located Attacks

In a co-located attack, the adversary sits physically beside or nearby the victim so that the adversary's login device/web browser is near the victim's enrolled mobile phone as well. Typical environments include public libraries, campus cafeterias, restaurants, trains, and other crowded scenarios. Since the adversary's login device/web browser can directly receive audio from the enrolled mobile phone, speaker and microphone fingerprints from the enrolled mobile phone are not sufficient to reject fake login attempts.

Embodiments of the invention defeat the co-located attack by measuring the distance between the enrolled mobile phone and the login device/web browser at the same time as conducting speaker and microphone fingerprinting. In another embodiment, measuring the distance between the enrolled mobile phone and the login device/web browser is not done at the same time as conducting speaker and microphone fingerprinting. Mobile phone users tend to keep their mobile phones very close, e.g., within hand reach, in crowded public environments. So embodiments can expect that the normal distance between the enrolled mobile phone and login device of a legitimate user is upper-bounded by a small distance range (e.g., 0.5 m). Embodiments of the invention can even require each user to put their device very close to the login device/web browser when the user tries to log in. This little effort mimics NFC communications to some extent and is still much more preferable than having to manually input a long passcode. Therefore, the login device/web browser will reject the login attempt if the detected distance from the enrolled mobile phone is above or outside of a safe threshold. Embodiments of the invention force the adversary to get very close to the victim and their enrolled mobile phone for a successful illegal login, in which case the adversary can be more easily exposed and thwarted.

5. Experiment Results

The experimental evaluation of the effectiveness and security of embodiments of the invention is described below.

5.1 Implementation

Embodiments were implemented and tested using a Lenovo E420 laptop as the login device 110 and another Lenovo E420 laptop as the web server 105. Embodiments of the invention as tested used Google Chrome (version 63.0.3239.132) as the web browser and the browser-side implementation was written in HTML5. The navigator.mediaDevices.getUserMedia( ) API was used to access the login device's microphone and record audios and the HTML <audio> element to access the login device's speaker and play a pre-record chirp audio file in the format of WAV. Embodiments of the invention as tested used Web Socket( ) API to build a TCP connection between the web browser and the web server for data transmission. Embodiments of the invention tested the mobile phone with a Google Android mobile phone. Embodiments as tested used different Android models including the Samsung Galaxy S5, Google Nexus 6, Nexus 7 and Huawei Honor 8. The mobile phone implementation was developed with Android Studio. Embodiments of the invention used the MediaPlayer( ) and MediaRecorder( ) APIs to play and record audios. The TCP connection between the mobile phone 125 and web server 105 was established with Socket( ) API.

5.2 Impact of MiM and Co-Located Attacks on One-Time Passcode

Experiments first evaluated the impact of MiM and co-located attacks on the one-time passcode scheme alone. Embodiments of the invention as tested used a Nexus 7 tablet as the login device 110 and a Samsung Galaxy S5 mobile phone 125 as the victim's mobile phone device. The volume level of the victim's mobile phone device was set as half of the maximum level.

For the MiM attack, and with reference to FIG. 2, embodiments as tested placed one eavesdropping device, monitoring mobile phone, 215 near the victim's mobile phone device 125. The monitoring phone was connected with another mobile phone 220 far away from the victim's mobile phone device through Wi-Fi. When the victim's mobile phone device transmitted a one-time passcode via acoustic channels, the monitoring phone 215 recorded the audio and forwarded it to the remote mobile phone 220, which then played the received audio using its speaker. The MiM attack succeeded when the login device 110 correctly extracted the one-time passcode from the audio replayed by the remote phone 220. For the co-located attack, embodiments as tested placed the attacker's login device 110 close to the victim's mobile phone device 125. The co-located attack succeeded when the login device correctly extracted the one-time passcode from the audio signal transmitted by the victim's mobile phone device.

Experiments were conducted in a noisy coffee house where it was more difficult for the login device to extract a correct passcode than in quite venues such as a lab and a library. Experiments varied the distance between the monitoring mobile phone device and the victim's mobile phone device and the distance between login device and the victim's mobile phone device. Each experiment was repeated 100 times.

Figure 6:
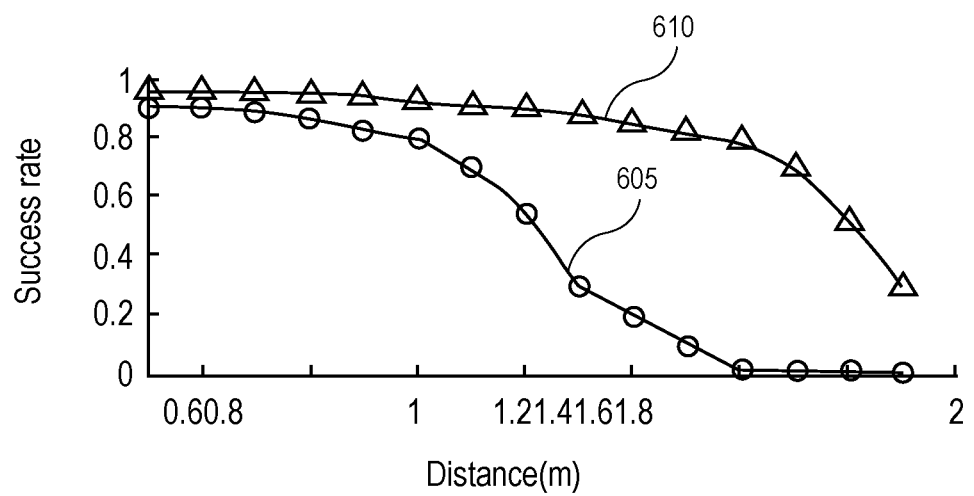
FIG. 6 depicts the success rate of MiM and co-located attacks.

FIG. 6 compares the success rate of the two attacks varying with the distance between the victim's mobile phone device and the attacker. As can be seen, the success rates of both the MiM attacks 605 and the co-located attacks 610 both decreased as the distance between the victim device and the attacker decreases, which was anticipated. In addition, the success rate of co-located attack was always higher than that of MiM attack. The reason is that under the MiM attack, the audio signals transmitted by the victim device needs to be recorded and then replayed, and that process may lead to reduced accuracy of the extracted fingerprint. Moreover, the success rates of both MiM and co-located attacks were higher than 80% when the attacker was 1 m away from the victim, indicating that one-time passcode scheme alone cannot defend against them in practical settings. These results highlight the need for device fingerprinting and cross-device distance ranging according to embodiments of the invention.

5.3 Effectiveness of Device Fingerprinting

Figure 7:
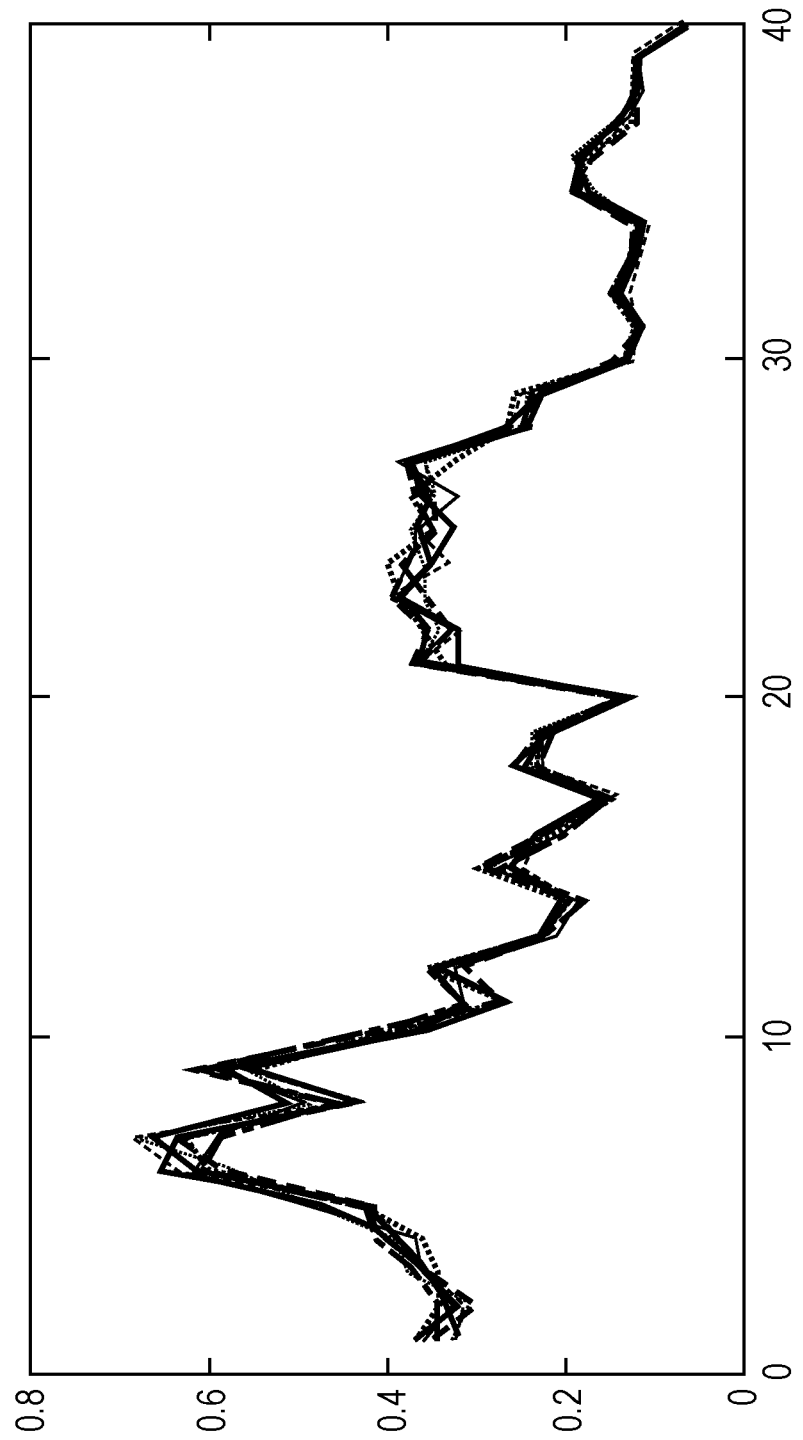
FIG. 7 illustrates one mobile device's fingerprint extracted by different devices.

Experiments verified the uniqueness of mobile device fingerprints. Embodiments of the invention as tested used nine mobile devices, including two Samsung Galaxy S5 mobile phones, two Google Nexus 6 mobile phones, two Nexus 7 mobile tablets, one Huawei Honor 8 mobile phone, one iPhone SE, and one iPhone 5. The volume of all the devices was set to half of the maximum volume. The experiments first chose a Samsung Galaxy 5 as the user's mobile phone device and extracted its fingerprint with each of the other eight mobile devices. The extracted fingerprints are shown in FIG. 7. As can be seen, the fingerprints of the same device extracted by different devices are very similar.

The experiments then used a Nexus 7 tablet as the login device to extract the fingerprints of all the other 8 mobile phone devices and compared them with the corresponding fingerprints extracted by each of the other seven mobile phone devices. The Euclid distances between the fingerprint extracted by the login device and the ones extracted by the other seven mobile phone devices are shown in FIG. 8, where the mobile phone devices listed on the X axis were used to extract the fingerprint of mobile phone devices listed on the Y axis. As can be seen from FIG. 8, the fingerprints extracted by the different mobile phone devices were very similar to the corresponding fingerprint extracted by the login device for all the mobile phone devices.

FIG. 9 shows the Euclid distance between the fingerprints of each pair of mobile phone devices extracted by the login device. As can be seen, the Euclid distance between the fingerprints of any two mobile phone devices is always larger than 0.4, indicating a mobile phone device's acoustic fingerprint can effectively distinguish different mobile phone devices. Based on these results, embodiments set the threshold $\tau$ to 0.4 in subsequent experiments.

The impact of a mobile phone device's volume level on the fingerprint accuracy was also evaluated. Specifically, embodiments as tested used three devices: a Samsung Galaxy S5, a Nexus 6, and an iPhone 5 for this set of experiments. Embodiments of the invention as tested set the volume of the three devices to different levels and used a Google Nexus 7 to extract their respective fingerprints at a distance of 0.5 m in a noisy coffee house. Since different devices divide the volume into different levels, embodiments scale the volume level from 0.1 to 1, in which 1 represents the maximum volume. Embodiments of the invention as tested were repeated in the experiment for 100 times.

Figure 10:
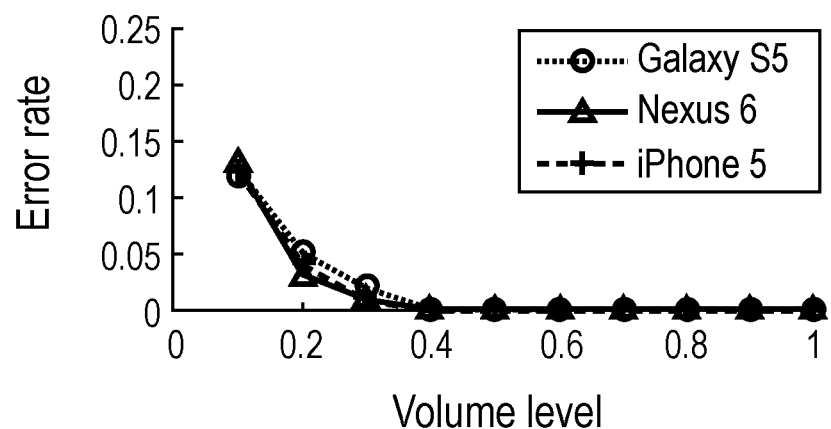
FIG. 10 illustrates the error rate of fingerprint extraction.

FIG. 10 shows the error rate in terms of the percentage of the times that the distance between the extracted fingerprint and the fingerprint extracted at half of the maximum volume exceeds $\tau$. As can be seen, the error rate was high when the volume was 0.1 for all the three devices. This is because the background noise makes the accuracy of the fingerprint low when the device volume level is low. In addition, as the volume level increases, the error rate decreases, which is expected. As the volume level exceeds 0.3 of the maximal volume level, the error rate drops below 0.01. These results indicate that embodiments can effectively identify fingerprints.

5.4 Embodiments Resilience Against MiM Attack

Section 4 above discussed the security of embodiments of the invention were analyzed against the MiM attack. Further experiments were used to evaluate the resilience of embodiments of the invention against the MiM attack.

Figure 11:
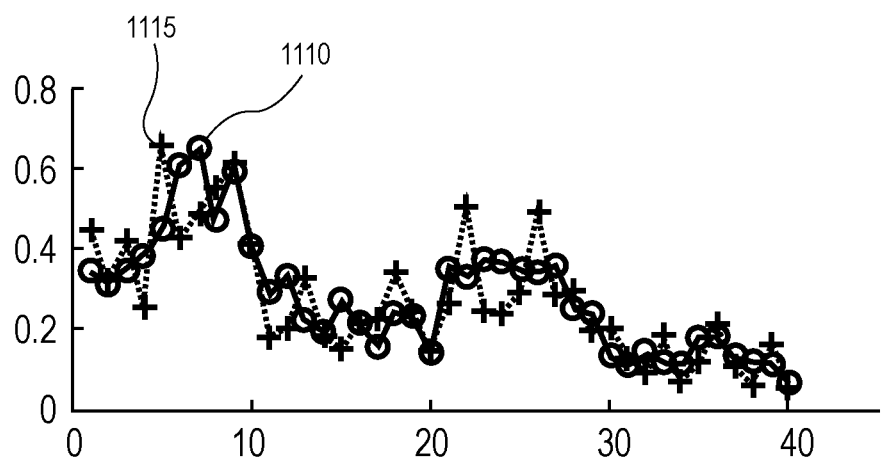
FIG. 11 illustrates the fingerprint extracted from replayed audio.

MiM attacks were launched in these experiments in the same way as described in Section 5.2. In particular, embodiments as tested used one Samsung Galaxy S5 as the victim mobile phone device and used two Nexus 7 to conduct the MiM attack. However, apart from checking the one-time passcode, the login device also verified the fingerprint of the mobile phone device. FIG. 11 compares the fingerprint 1115 of the victim's mobile phone device and the fingerprint 1110 of the attacker's mobile phone device extracted by the login device. As can be seen, the fingerprint of the attacker's mobile phone device extracted by the login device/web browser differs significantly from that of the victim's mobile phone device. Since the victim mobile phone device's fingerprint is stored in a permanent store of or accessible to the web server, the web server can easily identify the attacker's mobile phone device as illegitimate and deny the login request.

Further experiments were carried out. For each pair of mobile phone devices, say device A and device B, embodiments as tested uses device B to record the audio generated by device A and replay the audio to the login device. Embodiments of the invention as tested then compared the fingerprint extracted from the replayed audio with the original fingerprint of device A. FIG. 12 shows the normalized Euclid distance between each pair of fingerprints. Note that the embodiments as tested did not consider the fingerprint extracted from a self-recorded audio as the attacker's mobile phone device had no access to the legitimate user's mobile phone device. As can be seen from FIG. 12, the distance between the original fingerprint and the fingerprint extracted from replayed audios is always larger than 0.4 for all pair of fingerprints, which indicates that the embodiments as tested can easily distinguish the original audio from the audio replayed by an illegitimate device with proper threshold $\tau$. These results confirm that embodiments of the invention can effectively defend against the MiM attack.

5.5 Embodiments Resilience Against Co-Located Attack

Embodiments were first evaluated for the accuracy of the cross-device distance ranging method as well as the resilience of embodiments against a co-located attack.

Since embodiments of the invention are designed for different mobile phone devices to work under diverse environments, experiments evaluated the accuracy of cross-device distance ranging in a wide range of scenarios. Specifically, embodiments as tested used the distance ranging method to measure distance between a laptop and a mobile phone (L&P), a tablet and a mobile phone (T&P), a mobile phone and a mobile phone (P&P) each in three environments, including an office, a bookstore, and a coffee house. The experiments used a Lenovo Thinkpad E420 for the laptop, a Nexus 7 for the tablet, and a Samsung Galaxy S5 for the mobile phone. For each pair of devices and each environment, embodiments as tested set the distance between the two devices as 0.5 m, which is one embodiment's default maximum working distance. The experiments then performed the distance ranging method to measure their distance and calculate the ranging errors for each case.

Figure 13:
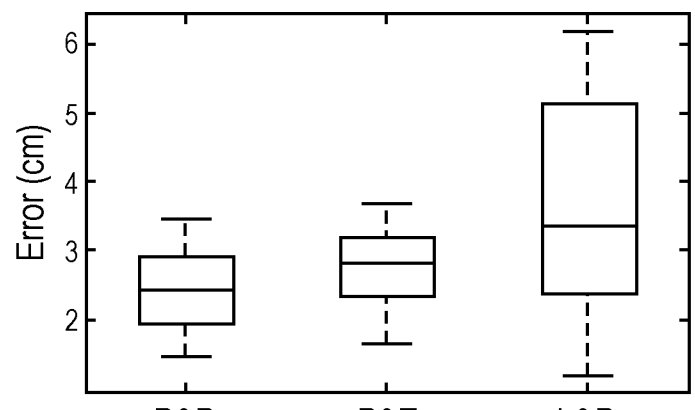
FIG. 13 illustrates the ranging error in different environments.
Figure 13:
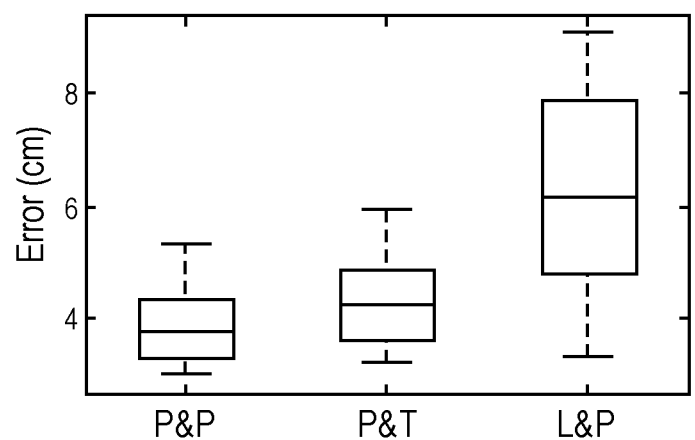
Figure 13:
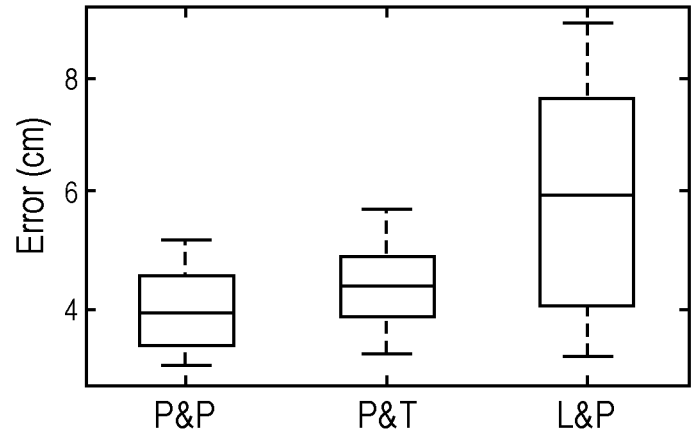

As can be seen from FIG. 13, the ranging accuracy for T&P and P&P was quite high with the average error in both cases below 5 cm in all three environments. In contrast, the ranging accuracy for (L&P) was slightly lower with the average error approximately 4.2 cm, 6.2 cm, and 6.3 cm in the office, bookstore, and coffee house environments, respectively. The reason is that the microphone of the laptop was at the top of screen and the speaker was behind keyboard. The distance between the laptop speaker and microphone was affected by the angle between screen and keyboard, which introduced additional error into the ranging result in comparison with tablet and mobile phone.

Experiments further evaluated the resilience of embodiments as tested against the co-located attack. The experiments used a Lenovo E420 laptop as the login device and a Samsung Galaxy S5 as the user mobile phone device. The volume of the user device was set to 30 percent of its maximum volume. The user device was first placed less than 0.5 m away from the login device to mimic the behavior of a legitimate user and then mimic the co-located attack by placing the user device more than 0.5 m away from the login device.

Figure 14:
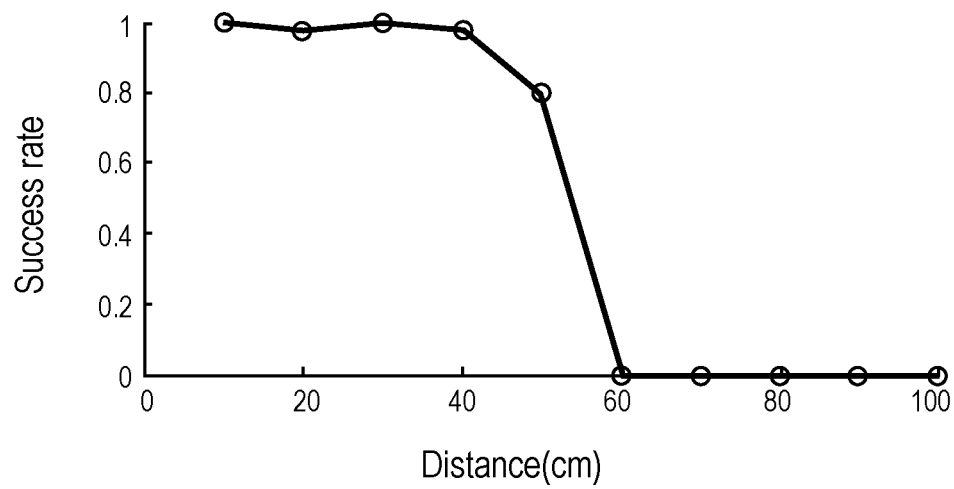
FIG. 14 depicts the success rate under different distance.

The distance was varied from 10 cm to 1 m with step length of 10 cm and then the authentication procedure was performed 50 times for each distance. As can be seen from FIG. 14, when the device was within 40 cm of the login device, the authentication succeeds for at least 98% of the cases. When the distance between the user mobile device and the login device was 50 cm, the authentication success rate dropped to around 80%, which was caused by the ranging error. Moreover, when an attacker launched a co-located attack from a distance of 60 cm or larger from the login device, none of the login attempts succeeded. These results show that the embodiments as tested were secure against the co-located attack.

5.6 Authentication Latency

The authentication latency of embodiments of the invention was evaluated and compared with that of Duo. 12 participants were asked to log into the online account using each of the three options for 10 times and the average authentication latency was measured. Not surprisingly, the phone call option took the longest time, 21 second on average. This is because the user had to answer the phone and wait until the end of voice instruction. The Duo push and SMS options took 3.3 seconds and 13.7 seconds on average, respectively.

Figure 15:
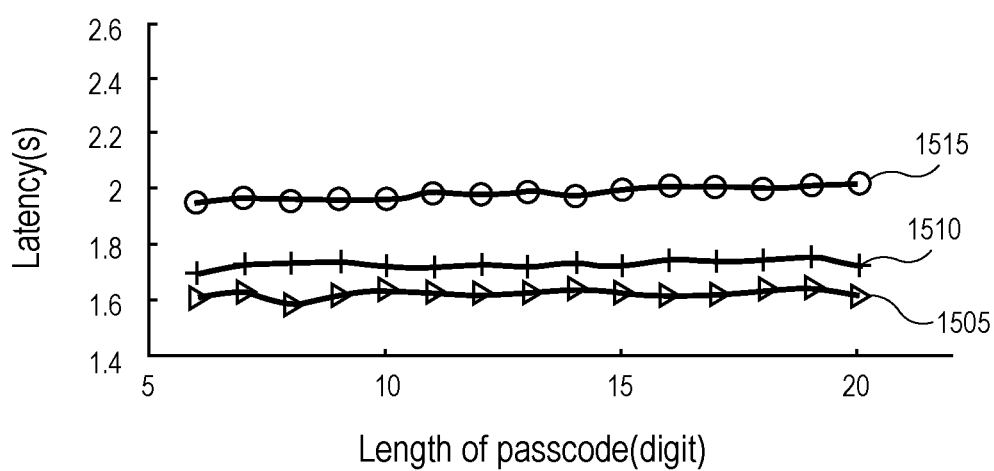
FIG. 15 depicts authentication latency of embodiments of the invention under different voice volume level and passcode length.

Experiments then measured the authentication latency of embodiments of the invention as tested in a noisy coffee shop. FIG. 15 shows the authentication latency varying with the length of the one-time passcode under different volumes, including volume 1505=0.3 (30% of maximum volume), volume 1510=0.2, and volume 1515=0.1, where the volume is scaled to be between 0 and 1 and 1 equals the maximum volume. As can be seen from FIG. 15, the higher the volume, the smaller the authentication latency, and vice versa. This is because higher volume leads to the decrease in the error rate of fingerprint extraction. In addition, the increase in the passcode length does not introduce significant increase to the system latency. Moreover, the authentication latency of the embodiments as tested is smaller than any of the three options of the Duo system even in the worst case. Therefore, the embodiments incur much smaller authentication latency than Duo under practical settings.

5.7 Usability Study

Further experiments asked the same set of 12 volunteers to use both Duo and embodiments of the invention as tested and conduct a survey about their experiences. A student account website of a university, which is integrated with the Duo system, was chosen for the experiments. The experiments used a Lenovo E420 as the login device and a Samsung Galaxy S5, installed with Duo App and embodiments, as the user mobile phone device. The volume of the mobile phone was set to half of its maximum volume. There were three 2FA options when a user tried to log into the online account. The user may respond by (1) pressing a bottom on the Duo App installed on their mobile device, (2) answering a phone call and then pressing a button, or (3) receiving a 6-digit one-time passcode via SMS and copying the passcode into the web-browser user interface. Every participant was asked to login to one account using all these three options and then use the embodiments as tested to log into the website. Afterwards, each volunteer was asked (Q1) whether the embodiment of the invention was easy to use, (Q2) whether the embodiment was faster than Duo, (Q3) whether the passcode and phone call options of Duo are bothersome, (Q4) whether they heard any obtrusive noise during the authentication procedure, and (Q5) their preference between Duo and an embodiment of the invention. The average survey scores are listed in Table 1 below, where the scores range from one (lowest) to five (highest). The results clearly indicate that embodiments of the invention, at least as tested, were very easy to use, unobtrusive, and more preferable than Duo.

TABLE 1

Usability scores

|  | Mean | Standard Deviation | Min | Median | Max |
| --- | --- | --- | --- | --- | --- |
| Q1 | 4.83 | 0.39 | 4 | 5 | 5 |
| Q2 | 4.25 | 0.75 | 3 | 4 | 5 |
| Q3 | 4.42 | 0.67 | 3 | 4 | 5 |
| Q4 | 1.36 | 0.67 | 1 | 1 | 3 |
| Q5 | 4.33 | 0.89 | 3 | 4 | 5 |

6. Computing Environment

Figure 16:
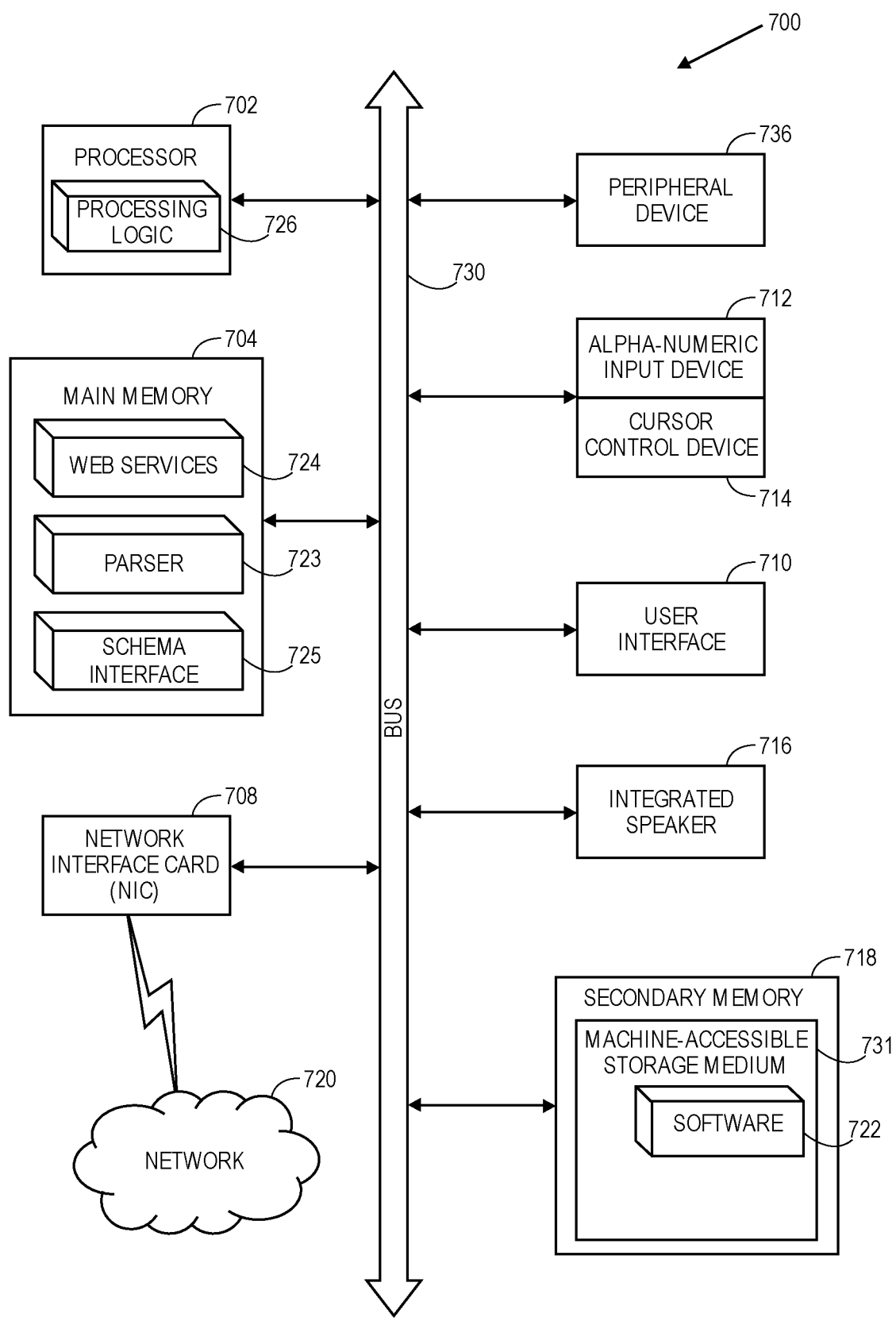
FIG. 16 illustrates a diagrammatic representation of a machine 700 in the exemplary form of a computer system, in accordance with one embodiment of the invention.

FIG. 16 illustrates a diagrammatic representation of a machine 700 in the exemplary form of a computer system, in accordance with one embodiment, within which a set of instructions, for causing the machine 700 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer to peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 718, which communicate with each other via a bus 730. Main memory 704 includes information and instructions and software program components necessary for performing and executing the functions with respect to the various embodiments of the systems, methods for implementing embodiments of the invention described herein. Instructions 723 may be stored within main memory 704. Main memory 704 and its sub-elements are operable in conjunction with processing logic 726 and/or software 722 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which are discussed herein.

The computer system 700 may further include one or more network interface cards 708 to interface with the computer system 700 with one or more networks 720. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.). The computer system 700 may perform the functions of determining and instructing a traffic signal to carry out the green lights activity and phase timings as determined by such a system 1000 as described herein.

The secondary memory 718 may include a non-transitory machine-readable storage medium (or more specifically a non-transitory machine-accessible storage medium) 731 on which is stored one or more sets of instructions (e.g., software 722) embodying any one or more of the methodologies or functions described herein. Software 722 may also reside, or alternatively reside within main memory 704, and may further reside completely or at least partially within the processor 702 during execution thereof by the computer system 700, the main memory 704 and the processor 702 also constituting machine-readable storage media. The software 722 may further be transmitted or received over a network 720 via the network interface card 708.

Some portions of this detailed description are presented in terms of algorithms and representations of operations on data within a computer memory. These algorithmic descriptions and representations are the means used by those skilled in the data processing arts to most effectively convey the substance of their work to others skilled in the art. An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system or computing platform, or similar electronic computing device(s), that manipulates and transforms data represented as physical (electronic) quantities within the computer system's registers and memories into other data similarly represented as physical quantities within the computer system memories or registers or other such information storage, transmission or display devices.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments of invention also relate to apparatuses for performing the operations herein. Some apparatuses may be specially constructed for the required purposes, or may comprise a general purpose computer(s) selectively activated or configured by a computer program stored in the computer(s). Such a computer program may be stored in a computer readable storage medium, such as, but not limited to, any type of disk including optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct more specialized apparatus to perform the required methods. The structure for a variety of these systems appears from the description herein. In addition, embodiments of the invention are not described with reference to any particular programming language. It will be appreciated that a variety of programming languages may be used to implement the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices, etc.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

The invention claimed is:

1. A method for allowing a user access to a computer-controlled resource, comprising:
   transmitting an authentication challenge to a computing device D of the user;
   receiving an authentication response as a human-inaudible acoustic signal automatically transmitted from the computing device without input from the user;
   obtaining one or both of a unique speaker fingerprint and a unique microphone fingerprint of the computing device by performing the following operations:
      transmitting a first plurality of audio signals, each at different frequencies, from a speaker of the computing device D,
      receiving and recording the first plurality of transmitted audio signals at a microphone of an access control device B and at a microphone of the computing device D,
      estimating a first plurality of energy losses associated with transmitting the first plurality of audio signals, each at different frequencies, from the speaker of the computing device D and receiving the first plurality of transmitted audio signals at the microphone of the computing device D,
      estimating a second plurality of energy losses associated with transmitting the first plurality of audio signals, each at different frequencies, from the speaker of the computing device D and receiving the first plurality of transmitted audio signals at the microphone of the access control device B, and
      obtaining the unique speaker fingerprint of the computing device based on the estimated first and second plurality of energy losses;
   wherein the method further comprises allowing access to the computer-controlled resource responsive to the received authentication response by comparing the obtained one or both of the unique speaker fingerprint and the unique microphone fingerprint of the computing device to a previously obtained one or both of the unique speaker fingerprint and the unique microphone fingerprint of the computing device of the user; and
   wherein the allowing access is further responsive to the comparison of the obtained one or both of the unique speaker fingerprint and the unique microphone fingerprint of the computing device to the previously obtained one or both of the unique speaker fingerprint and the unique microphone fingerprint of the computing device of the user.

2. The method of claim 1, wherein the human-inaudible acoustic signal automatically transmitted from the computing device without input from the user comprises an OFDM-modulated acoustic signal.

3. The method of claim 2, wherein the human-inaudible acoustic signal automatically transmitted from the computing device without input from the user comprises a Reed-Solomon encoded OFDM-modulated acoustic signal.

4. The method of claim 1,
   wherein estimating the first plurality of energy losses comprises:
      estimating the received audio signal power at each of the different frequencies for the received first plurality of transmitted audio signals recorded at the computing device D based on a transmission power at which the first plurality of audio signals are transmitted, an energy loss due to the speaker of the computing device D, and an energy loss of the microphone of the computing device D; and
   wherein estimating the second plurality of energy losses comprises:
      estimating the received audio signal power at each of the different frequencies for the received first plurality of transmitted audio signals recorded at the access control device B based on a transmission power at which the first plurality of audio signals are transmitted, an energy loss due to the speaker of the computing device, and an energy loss of the microphone of the access control device B.

5. The method of claim 1, further comprising estimating a physical distance between the computing device of the user and an access control device through which the user is to access to the computer-controlled resource; and
   wherein allowing access to the computer-controlled resource responsive to the received authentication response comprises:
   comparing the estimated distance to a threshold distance; and
   allowing access to the computer-controlled resource responsive to the received authentication response and further responsive to the comparison of the estimated distance to the threshold distance.

6. The method of claim 5, wherein estimating the physical distance between the computing device of the user and the access control device comprises:
   transmitting acoustic signals via respective speakers from the computing device and the access control device at respective first points in time;
   receiving the acoustic signals via respective microphones at the computing device and the access control device at respective second points in time; and
   estimating the physical distance between the computing device and the access control device given a time lapse between the transmission of the acoustic signals at the first points in time and the reception of the acoustic signals at the respective second points in time.

7. Non-transitory computer-readable storage media having instructions stored thereupon that, when executed a system having at least a processor and a memory therein, the instructions cause the system to perform operations for allowing a user access to a computer-controlled resource, the operations comprising:
   transmitting an authentication challenge to a computing device D of the user;
   receiving an authentication response as a human-inaudible acoustic signal automatically transmitted from the computing device without input from the user;
   obtaining one or both of a unique speaker fingerprint and a unique microphone fingerprint of the computing device by performing the following operations:
      transmitting a first plurality of audio signals, each at different frequencies, from a speaker of an access control device B, receiving and recording the first plurality of transmitted audio signals at a microphone of the access control device B and at a microphone of the computing device D, estimating a first plurality of energy losses associated with transmitting the first plurality of audio signals, each at different frequencies, from the speaker of the access control device B and receiving the first plurality of transmitted audio signals at the microphone of the access control device B, estimating a second plurality of energy losses associated with transmitting the first plurality of audio signals, each at different frequencies, from the speaker of the access control device B and receiving the first plurality of transmitted audio signals at the microphone of the computing device D, and obtaining the unique microphone fingerprint of the computing device based on the estimated first and second plurality of energy losses, wherein the instructions cause the system to perform further operations including allowing access to the computer-controlled resource responsive to the received authentication response by comparing the obtained one or both of the unique speaker fingerprint and the unique microphone fingerprint of the computing device to a previously obtained one or both of the unique speaker fingerprint and the unique microphone fingerprint of the computing device of the user; and wherein the allowing access is further responsive to the comparison of the obtained one or both of the unique speaker fingerprint and the unique microphone fingerprint of the computing device to the previously obtained one or both of the unique speaker fingerprint and the unique microphone fingerprint of the computing device of the user.

8. The non-transitory computer-readable storage media of claim 7, wherein estimating the first plurality of energy losses comprises:

estimating the received audio signal power at each of the different frequencies for the received first plurality of transmitted audio signals recorded at the access control device B based on a transmission power at which the first plurality of audio signals are transmitted, an energy loss due to the speaker of the access control device B, and an energy loss of the microphone of the access control device B; and wherein estimating the second plurality of energy losses comprises:

estimating the received audio signal power at each of the different frequencies for the received first plurality of transmitted audio signals recorded at the computing device D based on a transmission power at which the first plurality of audio signals are transmitted, an energy loss due to the speaker of the access control device B, and an energy loss of the microphone of the computing device D.

9. The non-transitory computer-readable storage media of claim 7, wherein the human-inaudible acoustic signal automatically transmitted from the computing device without input from the user comprises an OFDM-modulated acoustic signal.

10. The non-transitory computer-readable storage media of claim 9, wherein the human-inaudible acoustic signal automatically transmitted from the computing device without input from the user comprises a Reed-Solomon encoded OFDM-modulated acoustic signal.

11. The non-transitory computer-readable storage media of claim 7, wherein the instructions, when executed, cause the system to perform operations further comprising:

estimating a physical distance between the computing device of the user and an access control device through which the user is to access to the computer-controlled resource; and wherein allowing access to the computer-controlled resource responsive to the received authentication response comprises:

comparing the estimated distance to a threshold distance; and allowing access to the computer-controlled resource responsive to the received authentication response and further responsive to the comparison of the estimated distance to the threshold distance.

12. The non-transitory computer-readable storage media of claim 11, wherein estimating the physical distance between the computing device of the user and the access control device comprises:

transmitting acoustic signals via respective speakers from the computing device and the access control device at respective first points in time;

receiving the acoustic signals via respective microphones at the computing device and the access control device at respective second points in time; and estimating the physical distance between the computing device and the access control device given a time lapse between the transmission of the acoustic signals at the first points in time and the reception of the acoustic signals at the respective second points in time.

13. A system for allowing a user access to a computer-controlled resource, comprising:

a processor to execute software instructions;

a storage device in which to store social media data;

software instructions that when executed by the processor cause the system to:

transmit an authentication challenge to a computing device D of the user;

receive an authentication response as a human-inaudible acoustic signal automatically transmitted from the computing device without input from the user;

obtain one or both of a unique speaker fingerprint and a unique microphone fingerprint of the computing device by performing the following operations:

transmitting a first plurality of audio signals, each at different frequencies, from a speaker of the computing device D, receiving and recording the first plurality of transmitted audio signals at a microphone of an access control device B and at a microphone of the computing device D, estimating a first plurality of energy losses associated with transmitting the first plurality of audio signals, each at different frequencies, from the speaker of the computing device D and receiving the first plurality of transmitted audio signals at the microphone of the computing device D, estimating a second plurality of energy losses associated with transmitting the first plurality of audio signals, each at different frequencies, from the speaker of the computing device D and receiving the first plurality of transmitted audio signals at the microphone of the access control device B, and obtaining the unique speaker fingerprint of the computing device based on the estimated first and second plurality of energy losses;

wherein the software instructions of the system are further configured to:

allow access to the computer-controlled resource responsive to the received authentication response by comparing the obtained one or both of the unique speaker fingerprint and the unique microphone fingerprint of the computing device to a previously obtained one or both of the unique speaker fingerprint and the unique microphone fingerprint of the computing device of the user; and wherein the system to allow access is further responsive to the comparison of the obtained one or both of the unique speaker fingerprint and the unique microphone fingerprint of the computing device to the previously obtained one or both of the unique speaker fingerprint and the unique microphone fingerprint of the computing device of the user.

14. The system of claim 13, wherein the human-inaudible acoustic signal automatically transmitted from the computing device without input from the user comprises an OFDM-modulated acoustic signal.

15. The system of claim 14, wherein the human-inaudible acoustic signal automatically transmitted from the computing device without input from the user comprises a Reed-Solomon encoded OFDM-modulated acoustic signal.

16. The system of claim 13, wherein the software instructions that when executed by the processor cause the system to estimate the first plurality of energy losses comprises software instructions that when executed by the processor cause the system to:

estimate the received audio signal power at each of the different frequencies for the received first plurality of transmitted audio signals recorded at the computing device D based on a transmission power at which the first plurality of audio signals are transmitted, an energy loss due to the speaker of the computing device D, and an energy loss of the microphone of the computing device D; and wherein the software instructions that when executed by the processor cause the system to estimate the second plurality of energy losses comprises software instructions that when executed by the processor cause the system to:

estimate the received audio signal power at each of the different frequencies for the received first plurality of transmitted audio signals recorded at the access control device B based on a transmission power at which the first plurality of audio signals are transmitted, an energy loss due to the speaker of the computing device, and an energy loss of the microphone of the access control device B.

17. The system of claim 13, further comprising software instructions that when executed by the processor cause the system to estimate a physical distance between the computing device of the user and an access control device through which the user is to access to the computer-controlled resource; and wherein the software instructions that when executed by the processor cause the system to allow access to the computer-controlled resource responsive to the received authentication response comprises software instructions that when executed by the processor cause the system to:

compare the estimated distance to a threshold distance; and allow access to the computer-controlled resource responsive to the received authentication response and further responsive to the comparison of the estimated distance to the threshold distance.

18. The system of claim 17, wherein the software instructions that when executed by the processor cause the system to estimate the physical distance between the computing device of the user and the access control device comprises software instructions that when executed by the processor cause the system to:

transmit acoustic signals via respective speakers from the computing device and the access control device at respective first points in time;

receive the acoustic signals via respective microphones at the computing device and the access control device at respective second points in time; and estimate the physical distance between the computing device and the access control device given a time lapse between the transmission of the acoustic signals at the first points in time and the reception of the acoustic signals at the respective second points in time.

* * * * *